United States Patent
Sugiyama

(10) Patent No.: US 9,203,261 B2
(45) Date of Patent: Dec. 1, 2015

(54) EXCAVATOR

(75) Inventor: Yuta Sugiyama, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 197 days.

(21) Appl. No.: 13/979,160

(22) PCT Filed: Jan. 26, 2012

(86) PCT No.: PCT/JP2012/051708
§ 371 (c)(1),
(2), (4) Date: Jul. 11, 2013

(87) PCT Pub. No.: WO2012/102351
PCT Pub. Date: Aug. 2, 2012

(65) Prior Publication Data
US 2013/0300378 A1 Nov. 14, 2013

(30) Foreign Application Priority Data

Jan. 28, 2011  (JP) .................. 2011-016545

(51) Int. Cl.
*H02J 7/00* (2006.01)
*H02J 7/14* (2006.01)
*E02F 9/20* (2006.01)
*H01M 10/44* (2006.01)
*H01M 10/48* (2006.01)
(Continued)

(52) U.S. Cl.
CPC . *H02J 7/14* (2013.01); *E02F 9/128* (2013.01); *E02F 9/2091* (2013.01); *E02F 9/2095* (2013.01); *E02F 9/2217* (2013.01); *H01M 10/44* (2013.01); *H01M 10/48* (2013.01); *H02J 7/34* (2013.01)

(58) Field of Classification Search
CPC ............ H03H 7/40; H02J 5/005; H02J 17/00; H02J 7/025; H02J 7/35; H02J 7/0027; H02J 7/0029; H02J 7/0047; H02J 2007/0062; H02J 7/0055; H02J 7/14; H02J 7/34; B60L 11/1842; B60L 11/1824
USPC .................................................. 320/160–166
See application file for complete search history.

(56) References Cited

U.S. PATENT DOCUMENTS 6,166,517 A 12/2000 Wakashiro et al.
2006/0284614 A1 12/2006 Kim et al.
(Continued)

FOREIGN PATENT DOCUMENTS

JP 09-322314 12/1997
JP 2000-175306 6/2000
(Continued)

OTHER PUBLICATIONS

International Search Report mailed on Apr. 17, 2012.

*Primary Examiner* — Binh Tat
(74) *Attorney, Agent, or Firm* — IPUSA, PLLC

(57) ABSTRACT

An excavator includes an electric load, an electrical energy storage unit including an electrical energy storage part (19) that supplies electric power to the electric load, and a control unit (30) that controls an amount of charge to the electrical energy storage part (19) so that a charge rate of the electrical energy storage part (19) is between a system control upper limit value and a system control lower limit value. The control unit (30) controls the amount of charge to the electrical energy storage part (19) based on a changing trend of a detection value of the charge rate.

14 Claims, 16 Drawing Sheets

(51) Int. Cl.
*E02F 9/12* (2006.01)
*E02F 9/22* (2006.01)
*H02J 7/34* (2006.01)

(56) References Cited

U.S. PATENT DOCUMENTS

2010/0019726 A1* 1/2010 Kumar .......................... 320/125
2011/0175579 A1* 7/2011 Mazumdar ................... 320/167

FOREIGN PATENT DOCUMENTS

| | | |
|---|---|---|
| JP | 2004-186087 | 7/2004 |
| JP | 2004-266917 | 9/2004 |
| JP | 2006-278132 | 10/2006 |
| JP | 2007-071197 | 3/2007 |
| JP | 2008-547365 | 12/2008 |
| JP | 2009-114653 | 5/2009 |
| JP | 2009-273305 | 11/2009 |
| JP | 2010-041828 | 2/2010 |

* cited by examiner

EXCAVATOR

TECHNICAL FIELD

The present disclosure relates to an excavator that includes an electrical energy storage unit for supplying electric power to an electric work element.

BACKGROUND ART

An excavator with an electric work element that is driven by an electric motor or an electric actuator generally includes an electrical energy storage unit for supplying electric power to the electric work element. A hybrid excavator with a motor generator for assisting an engine (assist motor) generally includes an electrical energy storage unit including an electrical energy storage device or a battery for storing the electric power obtained by driving the motor generator. The assist motor is driven by the electric power from the electric energy storage unit to assist the engine. Also, the assist motor is driven by the power of the engine to generate power. The generated electric power is stored in the electrical energy storage device or battery of the electrical energy storage unit.

To supply electric power as requested, the electrical energy storage device or battery of the electrical energy storage unit is controlled so that its charge rate (e.g., SOC) may always be at least a certain value. Thus, when the charge rate (SOC) is dramatically decreased, a large charge current may be supplied to the electrical storage unit in an attempt to rapidly increase the charge rate (SOC). Because the electrical energy storage device or battery has internal resistance, heat generation may occur when a charge current is supplied thereby resulting in internal resistance power loss. Because the internal resistance power loss is proportional to the square of the current, the internal resistance power loss abruptly increases when the charge current is increased. Thus, to reduce the internal resistance and make efficient use of the electrical energy storage device or battery, the charge current is preferably arranged to be as small as possible.

In this respect, for example, Japanese Unexamined Patent Publication No. 2009-114653 discloses supplying electric power to a battery of an electrically-driven construction machinery from an external alternator via a power leveling unit. The power leveling unit limits the peak power of the electric power from the alternator to a predetermined upper limit value so as to level the electric power and supplies the leveled electric power to the battery of the construction machinery. That is, an upper limit value for the charge current is set and the charge current is prevented from exceeding this upper limit value.

RELATED ART DOCUMENT

Patent Document

Patent Document 1: Japanese Unexamined Patent Publication No. 2009-114653

DISCLOSURE OF THE INVENTION

Problem to be Solved by the Invention

In a case where one upper limit value is set up with respect to a charge current to be supplied to an electrical energy storage device or a battery and this upper limit value is set equal to a relatively high value, when the charge current is controlled to be only slightly below the upper limit value, a relatively large internal resistance power loss may occur and power supply may be inefficient. On the other hand, in a case where the upper limit value is set equal to a relatively low value, only a small charge current may be supplied so that the charge speed may decrease and the charge rate (SOC) may be not retained at a desirably high level.

Accordingly, the charge current or the charge power for the electrical energy storage unit is preferably controlled taking into account the charge rate (SOC) of the electrical energy storage device to make efficient use of the electrical energy storage part (electrical energy storage device or battery) of the electrical energy storage unit.

Means for Solving the Problem

According to an embodiment of the present invention, an excavator is provided that includes an electric load, an electrical energy storage unit including an electrical energy storage part that supplies electric power to the electric load, and a control unit that controls an amount of charge to the electrical energy storage part so that a charge rate of the electrical energy storage part is between a system control upper limit value and a system control lower limit value. The control unit controls the amount of charge to the electrical energy storage part based on a changing trend of a detection value of the charge rate.

Effects of the Invention

According to an aspect of the present invention, by controlling an amount of charge to an electrical energy storage unit based on a changing trend of the charge rate (e.g., SOC) of the electrical energy storage unit, charge power loss may be reduced and efficient power storage may be enabled, for example.

MODE FOR CARRYING OUT THE INVENTION

Figure 1:
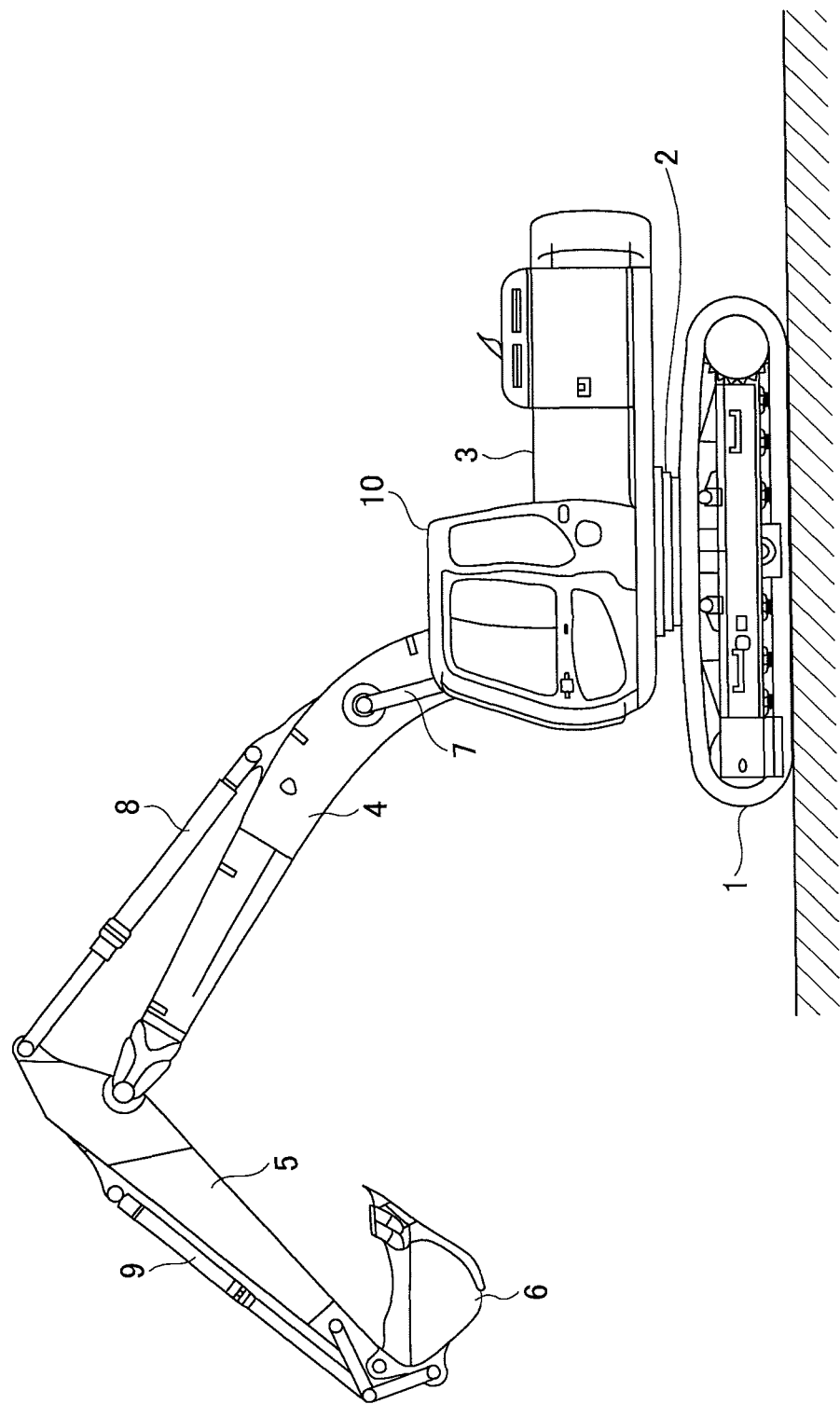
FIG. 1 is a side view of a hybrid excavator.

FIG. 1 is a side view of a hybrid excavator to which an embodiment of the present invention is implemented.

A lower running body 1 of the hybrid excavator carries an upper turning body 3 through a turning mechanism 2. A boom 4 is attached to the upper turning body 3. An arm 5 is attached at the end of the boom 4. A bucket 6 is attached at the end of the arm 5. The boom 4, the arm 5, and the bucket 6 are hydraulically driven by a boom cylinder 7, an arm cylinder 8, and a bucket cylinder 9, respectively. A cabin 10 is arranged in the upper turning body 3, and a power source, such as an engine, is mounted to the upper turning body 3.

It is noted that the excavator implementing an embodiment of the present invention is not limited to a hybrid excavator. That is, the present invention may be implemented in any type of excavator that includes an electrical energy storage unit including an electric excavator that receives charge power from an external power source, for example.

Figure 2:
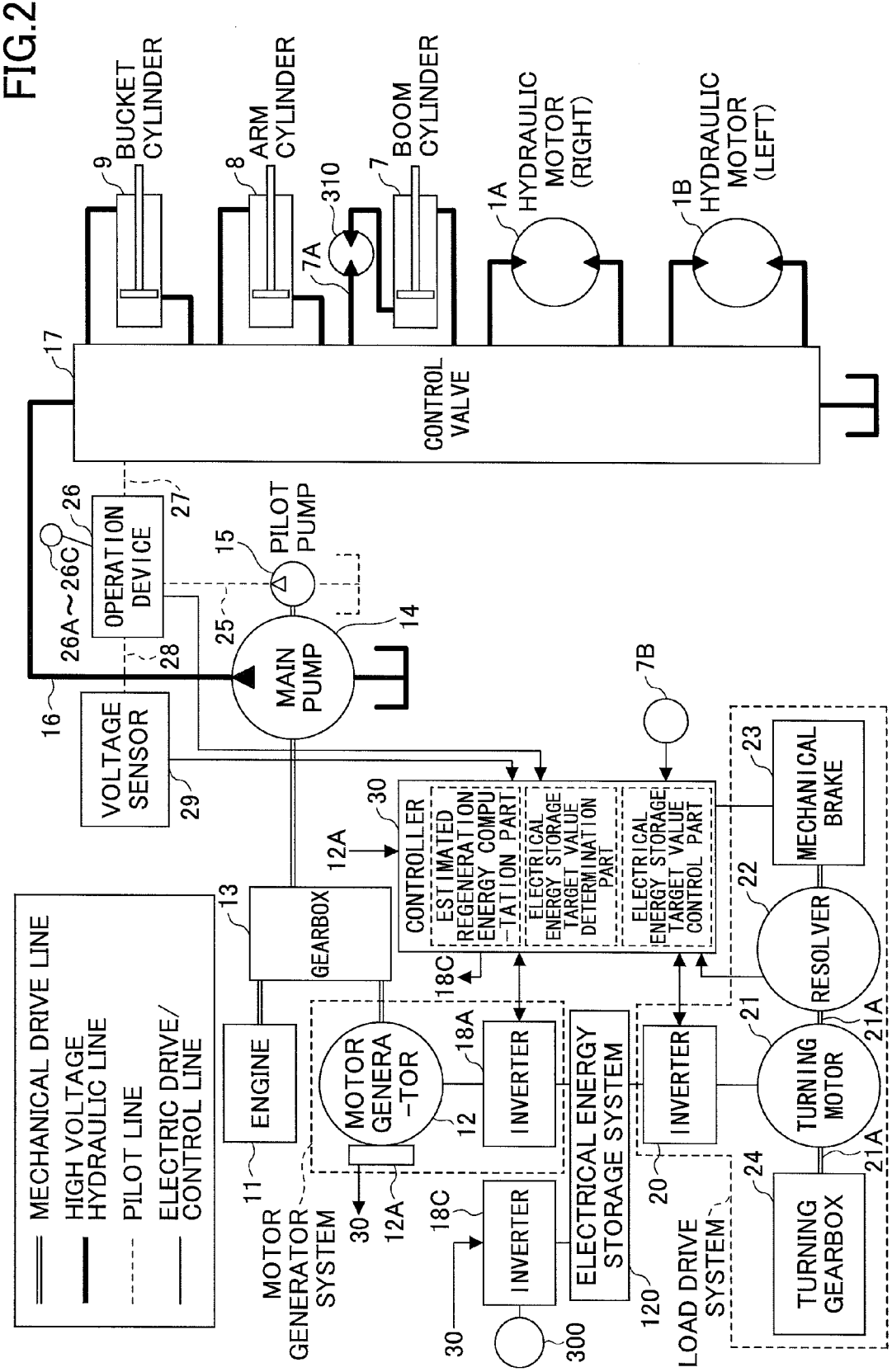
FIG. 2 is a block diagram illustrating a configuration of a drive system of a hybrid excavator according to an embodiment of the present invention.

FIG. 2 is a block diagram showing a configuration of a drive system of a hybrid excavator according to an embodiment of the present invention. In FIG. 2, the double line denotes a mechanical drive line, the thick solid line denotes a high voltage hydraulic line, the dotted line denotes a pilot line, and the thin solid line denotes an electric drive/control line.

An engine 11 as a mechanical drive part and a motor generator 12 as an assist drive part are connected to two input axes of a gearbox 13, respectively. A main pump 14 as a hydraulic pump and a pilot pump 15 are connected to the output axis of the gearbox 13. A control valve 17 is connected to the main pump 14 via a high voltage hydraulic line 16.

The control valve 17 is a control unit that controls a hydraulic system of the hybrid excavator. A hydraulic motor 1A (for the right side) and a hydraulic motor 1B (for the left side) are provided for driving the lower running body 1. The hydraulic motors 1A and 1B, the boom cylinder 7, the arm cylinder 8, and the bucket cylinder 9 are connected to the control valve 17 via the high voltage hydraulic line.

An electrical energy storage system (electrical energy storage unit) 120 including a capacitor as an electrical energy storage device is connected to the motor generator 12 via an inverter 18A. A turning motor 21 as an electric work element is connected to the electrical energy storage system 120 via an inverter 20. A resolver 22, a mechanical brake 23, and a turning gearbox 24 are connected to the axis of rotation 21A of the turning motor 21. An operation device 26 is connected to the pilot pump 15 via the pilot line 25. The turning motor 21, the inverter 20, the resolver 22, the mechanical brake 23, and the turning gearbox 24 comprise a load drive system.

The operation device 26 includes a lever 26A, a lever 26B, and a pedal 26C. The lever 26A, the lever 26B, and the pedal 26C are connected to each of the control valve 17 and a voltage sensor 29 via a hydraulic line 27 and a hydraulic line 28, respectively. The voltage sensor 29 is connected to a controller 30, and the controller 30 performs drive control of an electric system.

In the present embodiment, a boom regeneration motor 300 (also referred to as "generator 300") for obtaining boom regeneration power is connected to the electrical energy storage system 120 via an inverter 18C. The generator 300 is driven by a hydraulic motor 310, which is driven by a hydraulic fluid discharged from the boom cylinder 7. The generator 300 converts the potential energy of the boom 4 into electrical energy by using the voltage of the hydraulic fluid discharged from the boom cylinder 7 when the boom 4 is lowered by gravity. It is noted that in FIG. 2, the hydraulic motor 310 and the generator 300 are illustrated at separate locations for the sake of convenience of description. However, in practical applications, the axis of rotation of the generator 300 is mechanically connected to the axis of rotation of the hydraulic motor 310.

That is, the hydraulic motor 310 is arranged so that the hydraulic motor 310 is rotated by the hydraulic fluid that is discharged from the boom cylinder 7 when the boom 4 is lowered. The hydraulic motor 310 is configured to convert the energy generated when the boom 4 is lowered by gravity into a rotational force. The hydraulic motor 310 is arranged in a hydraulic piping 7A between the control valve 17 and the boom cylinder 7. The hydraulic motor 310 may be attached to a suitable location within the upper turning body 3.

The electric power generated by the generator 300 is supplied to the electrical energy storage system 120 through the inverter 18C as regeneration power. The generator 300 and the inverter 18C comprise a load drive system.

In the present embodiment, a boom angle sensor 7B for detecting the angle of the boom 4 is attached to the supporting shaft of the boom 4. The boom angle sensor 7B supplies the detected boom angle θB to the controller 30.

Figure 3:
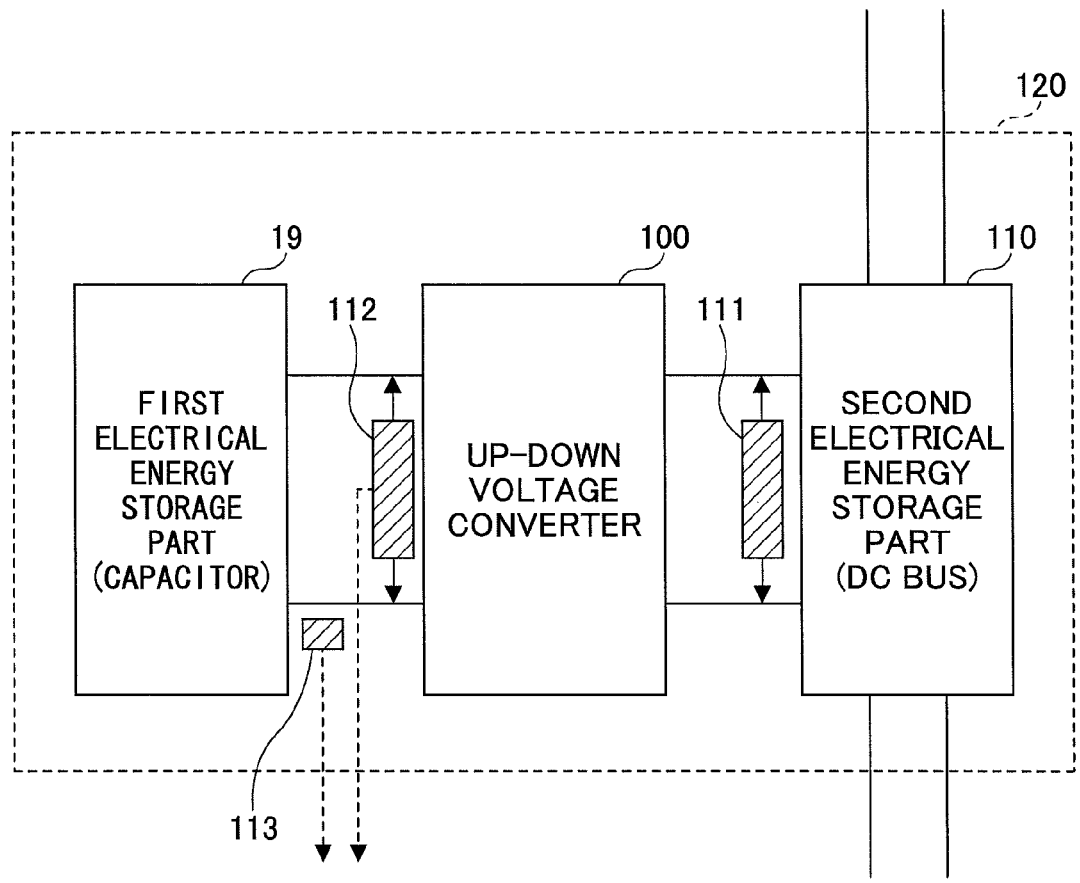
FIG. 3 is a block diagram illustrating a configuration of an electrical energy storage system.

FIG. 3 is a block diagram illustrating a configuration of the electrical energy storage system 120. The electrical energy storage system 120 includes a capacitor 19 as a first electrical energy storage part, an up-down voltage converter 100, and a DC bus 110. The DC bus 110 corresponds to a second electrical energy storage part that controls transfer of electric power between the capacitor 19 corresponding to the first electrical energy storage part, the motor generator 12, and the turning motor 21. A capacitor voltage detecting part 112 for detecting a capacitor voltage value and a capacitor current detecting part 113 for detecting a capacitor current value are arranged at the capacitor 19. The capacitor voltage value and the capacitor current value detected by the capacitor voltage detecting part 112 and the capacitor current detecting part 113 are supplied to the controller 30.

The up-down voltage converter 100 controls switching between a voltage raising operation and a voltage lowering operation according to the operating states of the motor generator 12, the generator 300, and the turning motor 21 so that the DC bus voltage value falls within a certain range. The DC bus 110 corresponding to the second electrical energy storage part is arranged between the inverters 18A, 18C, and 20 and the up-down voltage converter 100, and is configured to transfer electric power between the capacitor 19, the motor generator 12, the generator 300, and the turning motor 21.

Referring back to FIG. 2, the controller 30 corresponds to a control unit that acts as a main control part performing drive control of the hybrid excavator. The controller 30 comprises a processor unit that includes a CPU (central processing unit) and an internal memory. The functions of the controller 30 are implemented by the CPU executing a drive control program stored in the internal memory.

The controller 30 converts the signal received from the voltage sensor 29 into a speed command, and performs drive control of the turning motor 21 using the speed command. The signal received from the voltage sensor 29 is equivalent to the signal indicating the operational amount when the operation device 26 is operated to turn the turning mechanism 2.

The controller 30 controls operation of the motor generator 12 (switching of a motor-assisted operation and a power generating operation), and controls operation of the up-down voltage converter 100 as the voltage raising/lowering control unit to control charging/discharging of the capacitor 19. The controller 30 controls switching of the voltage raising operation and the voltage lowering operation of the up-down voltage converter 100 based on the charge state of the capacitor 19, the operating state of the motor generator 12 (motor-assisted operation or power generating operation) and the operating state (power operation or regeneration operation) of the turning motor 21, so that the charging/discharging of the capacitor 19 is controlled. Also, the controller 30 controls a charge amount (amount of charge current or charge power) to the capacitor 19 as described in detail below.

The switching control between the voltage raising operation and the voltage lowering operation of the up-down voltage converter 100 is carried out based on the DC bus voltage value detected by the DC bus voltage detecting part 111, the capacitor voltage value detected by the capacitor voltage detecting part 112, and the capacitor current value detected by the capacitor current detecting part 113.

In the above-described configuration, the power generated by the motor generator 12 corresponding to an assist motor is supplied to the DC bus 110 of the electrical energy storage system 120 via the inverter 18A, and supplied to the capacitor 19 via the up-down voltage converter 100. The regeneration power obtained by the regeneration operation of the turning motor 21 is supplied to the DC bus 110 of the electrical energy storage system 120 via the inverter 20, and supplied to the capacitor 19 via the up-down voltage converter 100. The power generated by the boom regeneration motor 300 is supplied to the DC bus 110 of the electrical energy storage system 120 via the inverter 18C, and supplied to the capacitor 19 via the up-down voltage converter 100.

The rotational speed (the angular velocity $\omega$) of the turning motor 21 is detected by the resolver 22. The angle (the boom angle $\theta B$) of the boom 4 is detected by the boom angle sensor 7B, such as a rotary encoder, arranged at the supporting shaft of the boom 4. The controller 30 computes an estimated turning regeneration power (energy) based on the angular velocity $\omega$ of the turning motor 21, and computes an estimated boom regeneration power (energy) based on the boom angle $\theta B$. Based on the estimated turning regeneration power and the estimated boom regeneration power obtained through such computations, the controller 30 computes (determines) an estimated regeneration target value (electrical energy storage target value) for the SOC. The controller 30 controls the respective parts of the hybrid excavator so that the SOC of the capacitor 19 comes close to the computed estimated regeneration target value.

Figure 4:
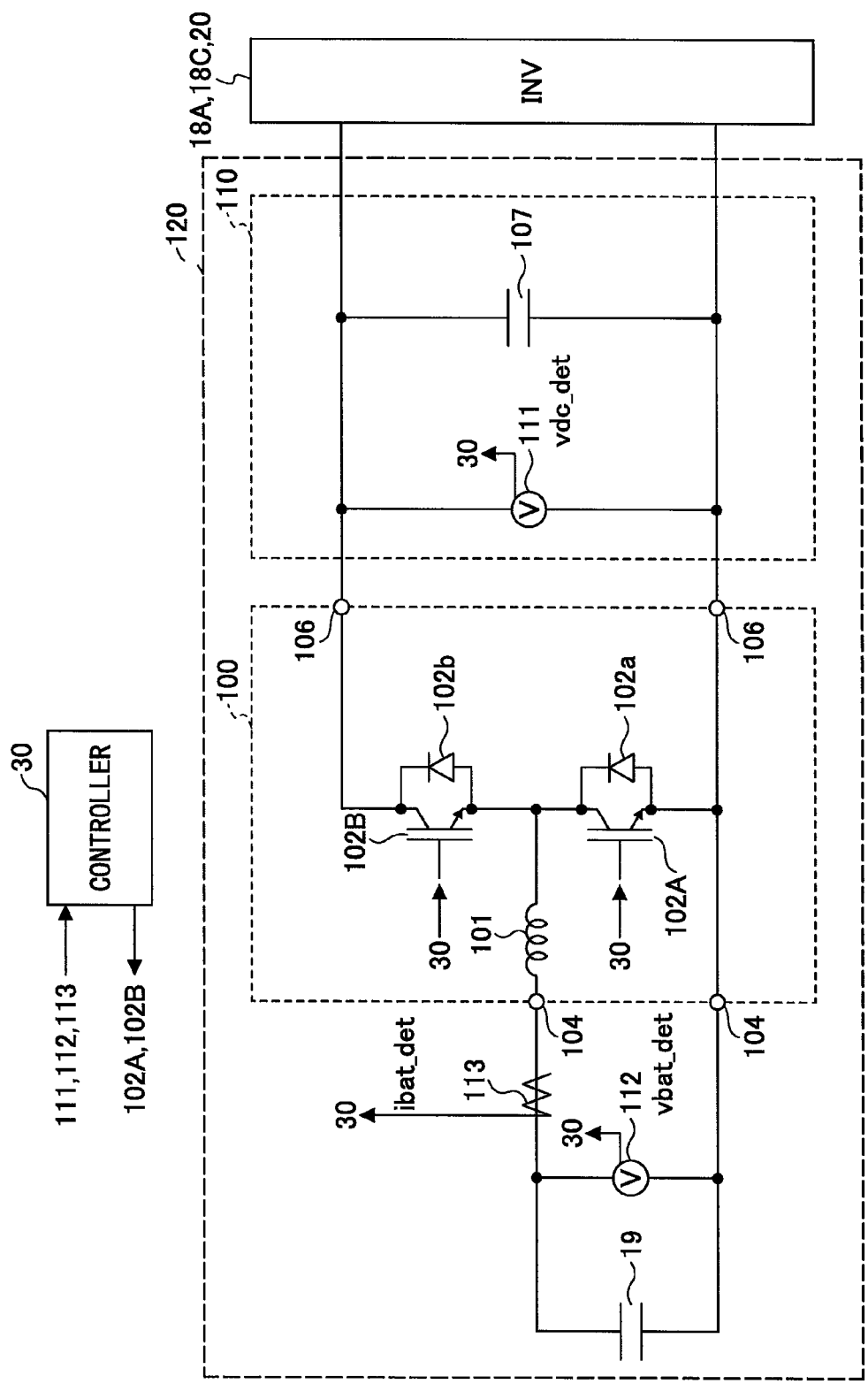
FIG. 4 is a circuit diagram of the electrical energy storage system.

FIG. 4 is a circuit diagram of the electrical energy storage system 120. The up-down voltage converter 100 includes a reactor 101, a voltage raising IGBT (insulated gate bipolar transistor) 102A, a voltage lowering IGBT 102B, a pair of power supply connection terminals 104 for connecting the capacitor 19, a pair of output terminals 106 for connecting the DC bus 110, and a smoothing capacitor 107 connected in parallel to the output terminals 106. The DC bus 110 is connected between the output terminals 106 of the up-down voltage converter 100 and the inverters 18A, 18C, and 20.

One end of the reactor 101 is connected to the midpoint of the voltage raising IGBT 102A and the voltage lowering IGBT 102B, and the other end of the reactor 101 is connected to one of the power supply connection terminals 104. The reactor 101 is arranged to supply an induced electromotive force that is generated upon switching ON/OFF the voltage raising IGBT 102A to the DC bus 110.

Each of the voltage raising IGBT 102A and the voltage lowering IGBT 102B is formed by a bipolar transistor in which a MOSFET (metal oxide semiconductor field effect transistor) is incorporated in the gate portion. Each of the voltage raising IGBT 102A and the voltage lowering IGBT 102B is a semiconductor element that is capable of switching large electric power at high speed. Each of the voltage raising IGBT 102A and the voltage lowering IGBT 102B is driven by the controller 30 supplying a PWM voltage to the gate terminal. A diode 102a and a diode 102b, which are rectifier elements, are connected in parallel to the voltage raising IGBT 102A and the voltage lowering IGBT 102B respectively.

The capacitor 19 may be a chargeable and dischargeable capacitor that enables transfer of electric power between the capacitor 19 and the DC bus 110 via the up-down voltage converter 100. It is noted that although the capacitor 19 is illustrated as an example of the first electrical energy storage part in FIG. 4, a chargeable and dischargeable secondary battery, such as a lithium ion battery, a lithium ion capacitor, or some other form of power supply that can deliver and receive electric power may be used instead of the capacitor 19.

The power supply connection terminals 104 and the output terminals 106 are terminals to which the capacitor 19 and the DC bus 110 are connected. The capacitor voltage detecting part 112 for detecting the capacitor voltage value is connected between the power supply connection terminals 104. The DC bus voltage detecting part 111 for detecting the DC bus voltage value is connected between the output terminals 106.

The capacitor voltage detecting part 112 detects the voltage value of the capacitor 19 (capacitor voltage: vbat_det). The DC bus voltage detecting part 111 detects the voltage value of the DC bus 110 (DC bus voltage: vdc_det). The smoothing capacitor 107 is an electrical energy storage element that is inserted between the positive-electrode terminal and the negative-electrode terminal of the output terminals 106 and is configured to smooth the DC bus voltage. The voltage of the DC bus 110 is maintained at a predetermined voltage by the smoothing capacitor 107. The capacitor current detecting part 113 is a detecting part for detecting the value of the current that flows through the capacitor 19. The capacitor current detecting part 113 includes a resistor for current detection. The capacitor current detecting part 113 detects the current value of the current flowing through the capacitor 19 (capacitor current: ibat_det).

When raising the voltage of the DC bus 110 by the up-down voltage converter 100, the PWM voltage is supplied to the gate terminal of the voltage raising IGBT 102A, and the induced electromotive force generated at the reactor 101 in response to switching ON/OFF the voltage raising IGBT 102A is supplied to the DC bus 110 through the diode 102b connected in parallel to the voltage lowering IGBT 102B. Thereby, the voltage of the DC bus 110 is increased.

When lowering the voltage of the DC bus 110 by the up-down voltage converter 100, the PWM voltage is supplied to the gate terminal of the voltage lowering IGBT 102B, and the regeneration power supplied via the voltage lowering IGBT 102B and the DC bus 110 is supplied from the DC bus 110 to the capacitor 19. Thereby, the capacitor 19 is charged by the power stored in the DC bus 110 and the voltage of the DC bus 110 is lowered.

In practical applications, a drive part, which generates the PWM signal for driving the voltage raising IGBT 102A and the voltage lowering IGBT 102B, is arranged between the controller 30 and each of the voltage raising IGBT 102A and the voltage lowering IGBT 102B. However, the illustration of the drive part is omitted in FIG. 4. Such a drive part may be implemented by either an electronic circuit or a processor unit.

In the hybrid excavator described above, the SOC of the capacitor 19 representing a charge rate of the capacitor 19 (referred to as "charge rate SOC" hereinafter) is always maintained at a high level so that the voltage of the capacitor 19 may be maintained at a high level. By charging the capacitor 19 while its voltage is at a high level, the charge current supplied to the capacitor may be decreased. Thus, for purposes of reducing internal resistance power loss, the charge rate SOC of the capacitor 19 is preferably maintained at a high level at all times.

However, during operation of the excavator, the capacitor 19 is repeatedly charged and discharged so that the charge rate SOC of the capacitor 19 constantly changes. That is, when the capacitor 19 is discharged to drive an electric load, the charge rate SOC decreases, and when the capacitor 19 is charged with the electric power generated by the motor generator 12 or the regenerative power generated by the generator (boom regeneration motor) 300, the charge rate SOC increases. Thus, in order to maintain the charge rate SOC of the capacitor 19 at a high level, an upper limit value and a lower limit value for system control of the charge rate SOC of the capacitor 19 are determined (referred to as "system control upper limit value" and "system control lower limit value" hereinafter).

Figure 5:
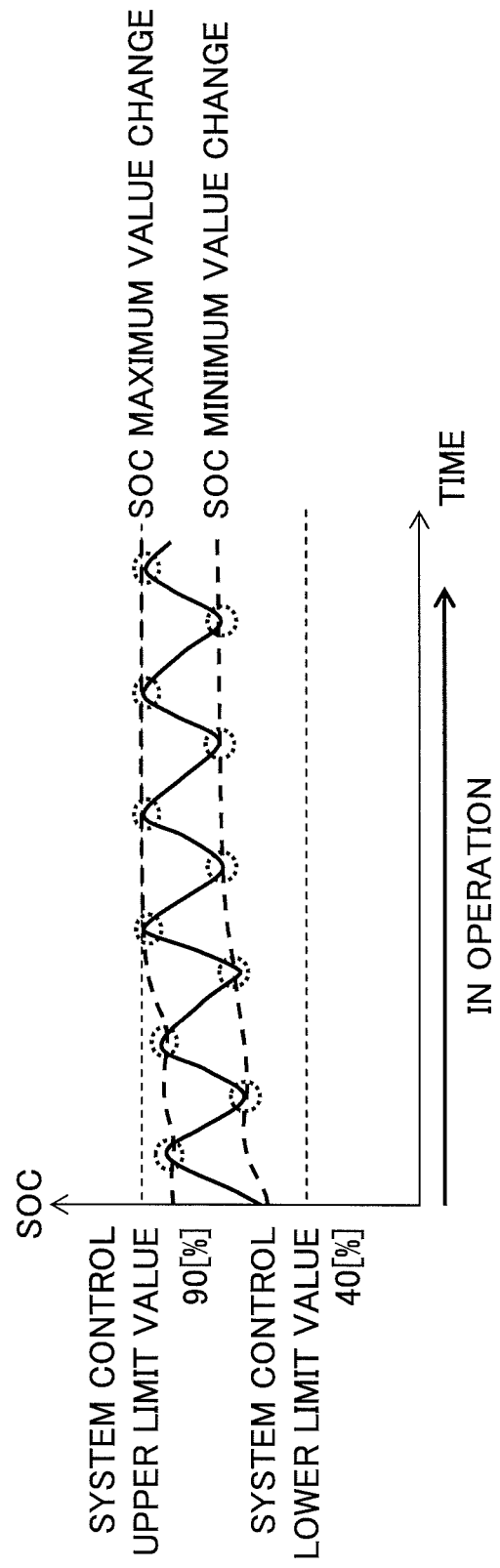
FIG. 5 is a graph illustrating a change in the charge rate of a capacitor during operation of the excavator.

FIG. 5 is a graph illustrating a change of the charge rate SOC of the capacitor 19 during operation of the excavator. In the example illustrated in FIG. 5, the system control upper limit value for the charge rate SOC is set equal to 90%, and the system control lower limit value is set equal to 40%. However, the system control upper limit value and the system control lower limit value are not limited to these values but may be set to other suitable values according to the drive system of the excavator and the state of the capacitor 19, for example. It is assumed that a 100% charge rate SOC of the capacitor 19 corresponds to the charge rate of the capacitor 19 when the capacitor 19 is at its rated voltage.

When operation of the excavator is started and the engine 11 is driven, power generation by the motor generator 12 is enabled. During operation of the excavator, normally, when an electric load is driven by the electric power of the capacitor 19 so that the charge rate SOC of the capacitor 19 decreases, the capacitor 19 is immediately charged so that the charge rate SOC of the capacitor 19 increases. That is, when the excavator starts operating, the capacitor 19 discharges power to drive the electric load of the excavator so that its charge rate SOC gradually decreases. When the electric load ceases to be driven, the capacitor 19 is charged so that its charge rate SOC starts increasing. It is noted that the point at which the change in the charge rate SOC transitions from a decrease to an increase is referred to as "minimum value". When charging of the capacitor 19 is started, the charge rate SOC of the capacitor 19 starts increasing. At some point, the capacitor 19 may have to discharge power to drive the electric load once again. At such a point, the charge rate SOC transitions from an increase to a decrease. It is noted that the point at which the charge rate SOC transitions from an increase to a decrease is referred to as "maximum value".

Normally, operation of the excavator involves the performance of repetitive movements such as drilling. Thus, the change of the charge rate SOC of the capacitor 19 may oftentimes be represented by a repetition of similar waveforms such as those illustrated in FIG. 5. In the example illustrated in FIG. 5, certain limits are imposed on the charge current supplied to the capacitor 19. That is, an upper limit value for the charge current is set up, and the charge current supplied to the capacitor 19 is controlled to be less than or equal to the upper limit value.

The value of the charge current for the capacitor 19 is proportional to the rising speed of the charge rate SOC. When the charge current is large, the rising speed of the charge rate SOC is accelerated and the charge rate SOC changes at a faster rate from the minimum value to the maximum value in FIG. 5 so that the capacitor 19 can be quickly charged. However, when the charge current for the capacitor 19 is too large, problems such as heat generation may occur due to the internal resistance of the capacitor 19. Thus, the charge current has to be controlled to be within a certain limit and the upper limit value for the charge current is set up. That is, the charge current (or charge power) for the capacitor 19 is controlled to be less than or equal to a certain upper limit value.

In the example illustrated in FIG. 5, the charge current (amount of charge) used for the repeated charging operations is a sufficiently large current for maintaining the charge rate SOC at the desired level and the average value of the charge rate SOC (the intermediate value of the minimum value and the maximum value) gradually increases. Then, because charge rate SOC is controlled to not exceed the system control upper limit value, the maximum value of the charge rate SOC is retained at the system control upper limit value. Thus, in the example illustrated in FIG. 5, the average value of the charge rate SOC is always maintained at a desirably high level.

It is noted that the greater the charge current for the capacitor 19, the faster the rise of the charge rate SOC of the capacitor 19 and the easier it is to maintain the charge rate SOC at the desired high level. However, because the energy loss caused by the internal resistance of the capacitor 19 while the capacitor 19 is charged is proportional to the square of the charge current, when the rising speed of the charge rate SOC of the capacitor 19 is accelerated to an exceedingly high level, the energy efficiency of the capacitor 19 is degraded.

Accordingly, in the present embodiment, the charge current or the charge power is controlled so that the charge rate SOC may be maintained as high as possible to make efficient use of the capacitor 19. Specifically, in the present embodiment, the charge rate SOC is controlled to be maintained at a desirably high level while it changes by controlling the amount of charge (amount of charge current or charge power) to the capacitor 19 based on a changing trend of the charge rate SOC of the capacitor 19. More specifically, charge power control or charge current control is switched between different stages according to a change (or changing trend) of the minimum value and the maximum value of the charge rate SOC so as to control and maintain the charge rate SOC at a desirably high level.

Figure 6:
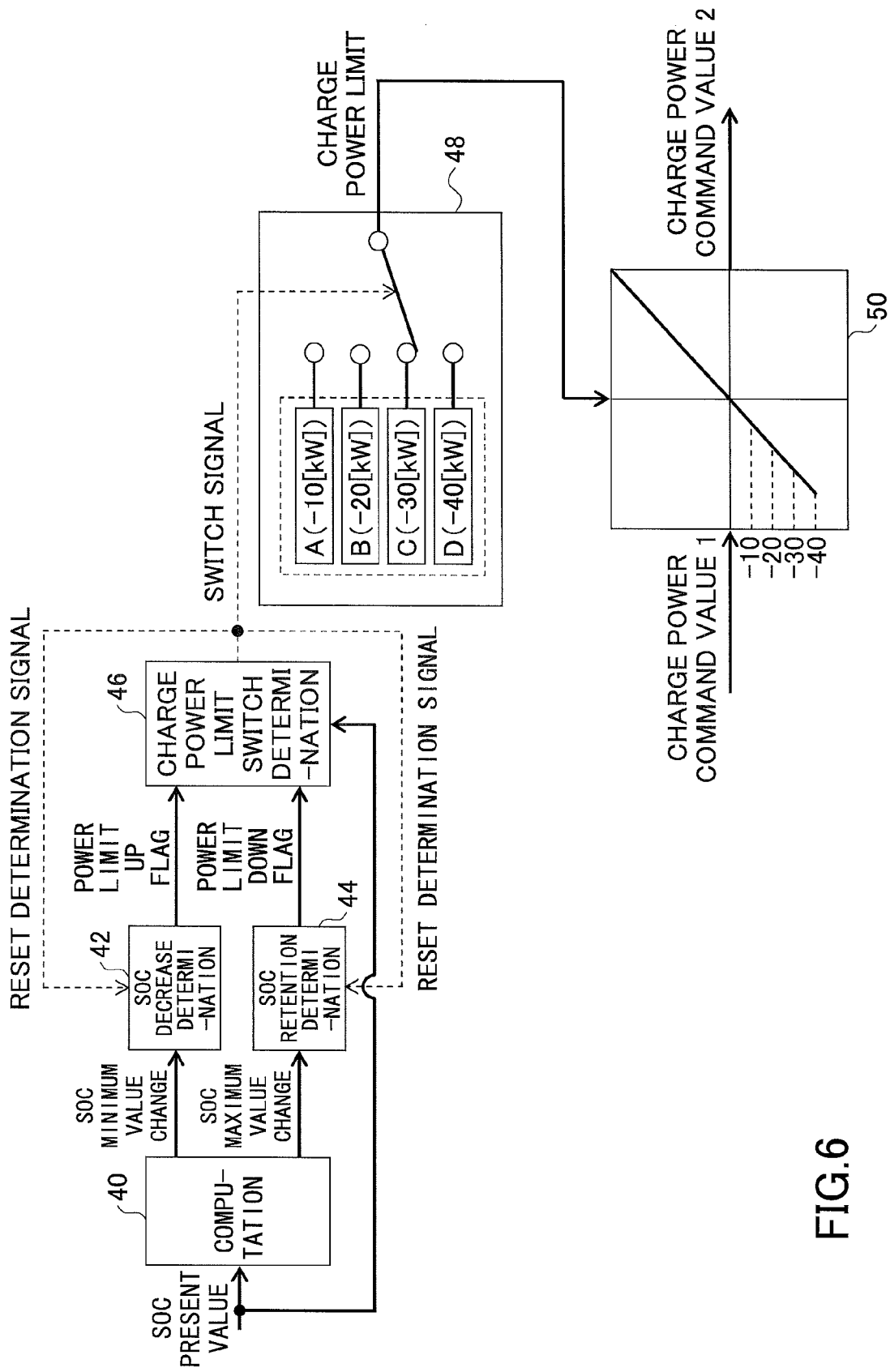
FIG. 6 is a block diagram illustrating charge amount control according to a first embodiment of the present invention.

FIG. 6 is a block diagram illustrating charge amount control according to a first embodiment of the present invention. In the charge amount control according to the present embodiment, at computation block 40, the minimum value and the maximum value of the charge rate SOC of the capacitor 19 are computed based on input values of the present charge rate SOC of the capacitor 19 that are iteratively obtained with the progression of time. The computed minimum value is output to SOC decrease determination block 42, and the computed maximum value is output to SOC retention determination block 44.

At the SOC decrease determination block 42, a determination is made as to whether the charge rate SOC is decreasing based on a change in the input minimum value. If it is determined that the charge rate SOC is decreasing, a power limit up flag is generated. Specifically, at the SOC decrease determination block 42, a present minimum value that is iteratively computed with the progression of time is compared to a previously computed minimum value and a determination is made as to whether the present minimum value has decreased (is smaller) with respect to the previous minimum value N consecutive times. It is noted that N denotes an arbitrary integer (minimum value consecutive decrease number). For example, assuming N=3, a determination is made as to whether the present minimum value has decreased with respect to the previous minimum value three consecutive times. The power limit up flag is a flag indicating that the charge rate SOC is likely to continue decreasing.

Also, at the SOC decrease determination block 42, a determination is made as to whether the input minimum value is less than or equal to the system control lower limit value. If the minimum value is determined to be less than or equal to the lower limit value, a power limit maximum up flag is generated. The power limit maximum up flag indicates that the charge rate SOC has fallen to an exceedingly low level so that the capacitor 19 needs to be quickly charged.

On the other hand, at the SOC retention determination block 44, a determination is made as to whether the charge rate has been retained based on a change in the maximum value. If it is determined that the charge rate SOC is retained, the power limit down flag is generated. Specifically, at the SOC retention determination block 44, a present maximum value that is iteratively computed with the progression of time is compared to a previously computed maximum value and a determination is made as to whether the present maximum value has been greater than or equal to the previous maximum value (retained) N consecutive times. It is noted that N denotes an arbitrary integer (maximum value consecutive increase number). For example, assuming N=3, a determination is made as to whether the present maximum value has been greater than or equal to the previous maximum value (retained) three consecutive times. The power limit down flag is a flag indicating that the charge rate SOC is likely to be retained. Also, at the SOC retention determination block 44, the present maximum value that is iteratively computed with the progression of time is compared to the system control upper limit value and a determination is made as to whether the present maximum value has been greater than or equal to the system control upper limit value (retained) N consecutive times. It is noted that N denotes an arbitrary integer (maximum value consecutive increase number). For example, assuming N=3, a determination is made as to whether the present maximum value has been retained at the system control upper limit value three consecutive times. It is noted that the power limit down flag is also generated when it is determined that the maximum value has been retained at the system control upper limit value three consecutive times.

Next, at charge power limit switch determination block 46, a switch signal for switching a charge power limit stage is generated and supplied to a switch block 48. For example, when the power limit up flag is generated, the charge power limit switch determination block 46 may supply a switch signal for switching the charge power limit stage to a stage that is one level higher to the switch block 48. Also, when the power limit maximum up flag is generated, the charge power limit switch determination block 46 may supply a switch signal for switching the charge power limit stage to the highest stage to the switch block 48. On the other hand, when the power limit down flag is generated, the charge power limit switch determination block 46 may supply a switch signal for switching the charge power limit stage to a stage that is one level lower to the switch block 48.

The charge power limit stages define multi-tiered limits for the electrical energy to be supplied to the capacitor 19. For example, stage A defines the charge power limit as less than or equal to −10 kW, stage B as less than or equal to −20 kW, stage C as less than or equal to −30 kW, and stage D as less than or equal to −40 kW. The switch block 48 is configured to select one of these stages based on the switch signal and output the corresponding charge power limit value (i.e., −10 kW, −20 kW, −30 kW, or −40 kW) to a limiter 50 corresponding to a limitation part.

The limiter 50 receives a charge power command value 1 from the controller 30. The limiter 50 adds a corresponding limitation to the charge power command value 1 based on the charge power limit value supplied from the switch block 48 to generate a charge power command value 2 and outputs the generated charge power command value 2 to an upper-level system. Thus, the charge power command value 2 output from limiter 50 corresponds to a command value having a limitation added thereto based on the changing trend of the charge rate SOC. In the present embodiment, the charge power command value 2 corresponds to a value that is limited to be less than or equal to −10 kW, −20 kW, −30 kW, or −40 kW according to the changing trend of the charge rate SOC as described above. The charge power command value 2 corresponds to a command value for the charge power to be actually supplied to the capacitor 19.

It is noted that the charge power limit switch determination block 46 outputs a reset determination signal to the SOC decrease determination block 42 and the SOC retention determination block 44 in addition to outputting the switch signal to the switch block 48. Upon receiving the reset signal, the SOC decrease determination block 42 and the SOC retention determination block 44, reinitiates the comparison of the minimum value and the maximum value N consecutive times.

It is noted that the comparison of the minimum value and the maximum value N consecutive times is performed for the purpose of determining whether the charge rate SOC has an increasing tendency or a decreasing tendency. Thus, the determination does not necessarily have to be based on whether the minimum value has decreased N consecutive times or the maximum value has been retained N consecutive times. That is, as long as the changing trend of the charge rate SOC within a certain time period can be determined, the determination does not have to be based on comparisons of the minimum value and the maximum value made N consecutive times and may instead be based on comparisons made every other time, for example. Alternatively, the determination may be made based on the moving average of the minimum value and the maximum value, for example.

Also, the detection value to be detected for determining the changing trend of the charge rate SOC is not limited to the minimum value and the maximum value of the charge rate SOC. For example, the detection value may be detected after a predetermined time period elapses from the time the charge rate reaches the minimum value or the maximum value. Also, the determination may be made based on whether a change rate is greater than or equal to a predetermined value, for example. Specifically, the changing trend of the charge rate SOC may be determined based on whether the difference between the detection value of the present charge rate SOC and the detection value of the charge rate SOC after a predetermined time period is greater than or equal to a predetermined value, for example.

It is noted that although limitations are imposed on the charge power to implement charge amount control in the present embodiment, limitations may alternatively be imposed on the charge current to implement charge amount control for controlling the amount of charge to the capacitor 19, for example.

Figure 7:
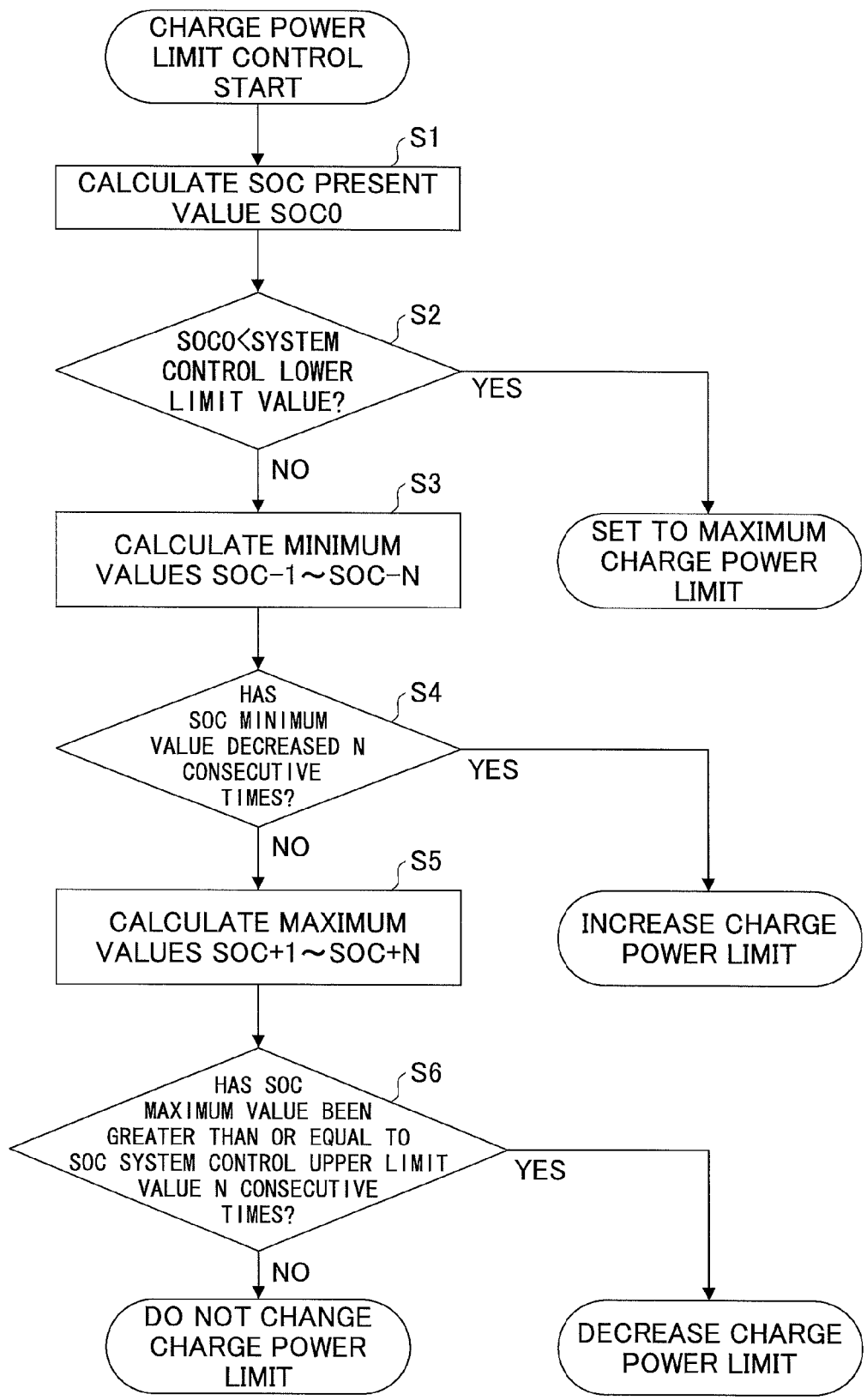
FIG. 7 is a flowchart illustrating process steps of a charge amount control process.

FIG. 7 is a flowchart illustrating process steps of a charge amount control process. First, when the charge amount control process is started, in step S1, a present value SOC0 of the charge rate SOC of the capacitor 19 is computed. Then, in step S2, a determination is made as to whether the present value SOC0 of the charge rate SOC is below the system control lower limit value for the charge rate SOC (see FIG. 5).

If the present value SOC0 of the charge rate SOC is below the system control lower limit value (step S2, YES), the charge power limit stage is switched to the highest stage (stage D). That is, because the current charge rate is too low, the capacitor 19 needs to be quickly charged. Thus, the charge power limit is set up to a maximum value so that a large charge power may be supplied to the capacitor 19.

On the other hand, if the present value SOC0 of the charge rate SOC is greater than or equal to the system control lower limit value (step S2, NO), the process proceeds to step S3.

It is noted that the above process steps are performed before the charge amount control illustrated in FIG. 6 is implemented.

Next, in step S3, the minimum value of the charge rate SOC is calculated N times. SOC-1 denotes the first calculated value and SOC-N denotes the Nth calculated value. After the Nth calculated value SOC-N is calculated, in step S4, a determination is made as to whether the minimum value of the charge rate SOC has decreased N consecutive times.

If the minimum value of the charge rate SOC has decreased N consecutive times (step S4, YES), the charge power limit stage is switched to a stage that is one level higher to increase the charge power limit value. For example, if the charge power limit stage at the time the minimum value of the charge rate SOC has decreased N consecutive times corresponds to stage B, the charge power limit stage is switched to stage C and the charge power limit value is increased from −20 kW of stage B to −30 kW of stage C. It is noted that the charge power limit value is expressed as a negative value in order to distinguish the charge power from the discharge power, which is expressed as a positive value. Thus, in the case where the capacitor 19 is charged at −20 kW maximum, by switching the charge power limit value, the capacitor 19 may be charged at −30 kW maximum so that the capacitor 19 may be quickly charged to counter the decreasing tendency of the charge rate SOC.

On the other hand, if it is determined that the minimum value of the charge rate SOC has not decreased N consecutive times (step S4, NO), the process proceeds to step S5. In step S5, the maximum value of the charge rate SOC is calculated N times. SOC+1 denotes the initial calculated value and SCO+N denotes the Nth calculated value. After the Nth calculated value SOC+N is calculated, in step S6, a determination is made as to whether the maximum value of the charge rate SOC has been greater than or equal to the system control upper limit value for the charge rate SOC (see FIG. 5) N consecutive times, or whether the maximum value of the charge rate has increased N consecutive times.

If the maximum value of the charge rate SOC has been greater than or equal to the system control upper limit value for the charge rate SOC N consecutive times or if the maximum value of the charge rate SOC has increased N consecutive times (step S6, YES), the charge power limit stage is switched to a stage that is one level lower to decrease the charge power limit value. For example, if the charge power limit stage at the time the maximum value of the charge rate SOC has increased N consecutive times corresponds to stage C, the charge power limit stage is switched to stage B and the charge power limit value is decreased from −30 kW of stage C to −20 kW of stage B. It is noted that the charge power limit value is expressed as a negative value in order to distinguish the charge power from the discharge power, which is expressed as a positive value. Thus, in the case where the capacitor 19 is charged at −30 kW maximum, by switching the charge power limit value, charge power to be supplied to the capacitor 19 may be limited to −20 kW maximum so that the amount of charge to the capacitor 19 may be reduced and the charge rate SOC may be controlled to decrease.

On the other hand, if it is determined that the maximum value of the charge rate SOC has not been greater than or equal to the system control upper limit value for the charge rate SOC N consecutive times or that the maximum value of the charge rate SOC has not increased N consecutive times (step S6, NO), the charge amount limit stage is maintained as is and the charge amount limit value is not changed. If the maximum value of the charge rate SOC has not been greater than or equal to the system control upper limit value for the charge rate SOC N consecutive times; namely, if the case where the maximum value of the charge rate SOC becomes greater than or equal to the system control upper limit value does not occur N consecutive times, or the maximum value of the charge rate SOC has not increased N consecutive times, it is determined that the charge rate SOC of the capacitor 19 has not been increased to an exceedingly high level so that the current charge power limit does not have to be decreased. Thus, the charge power limit is not decreased in this case.

Next, the above charge power control process is described in greater detail.

Figure 8:
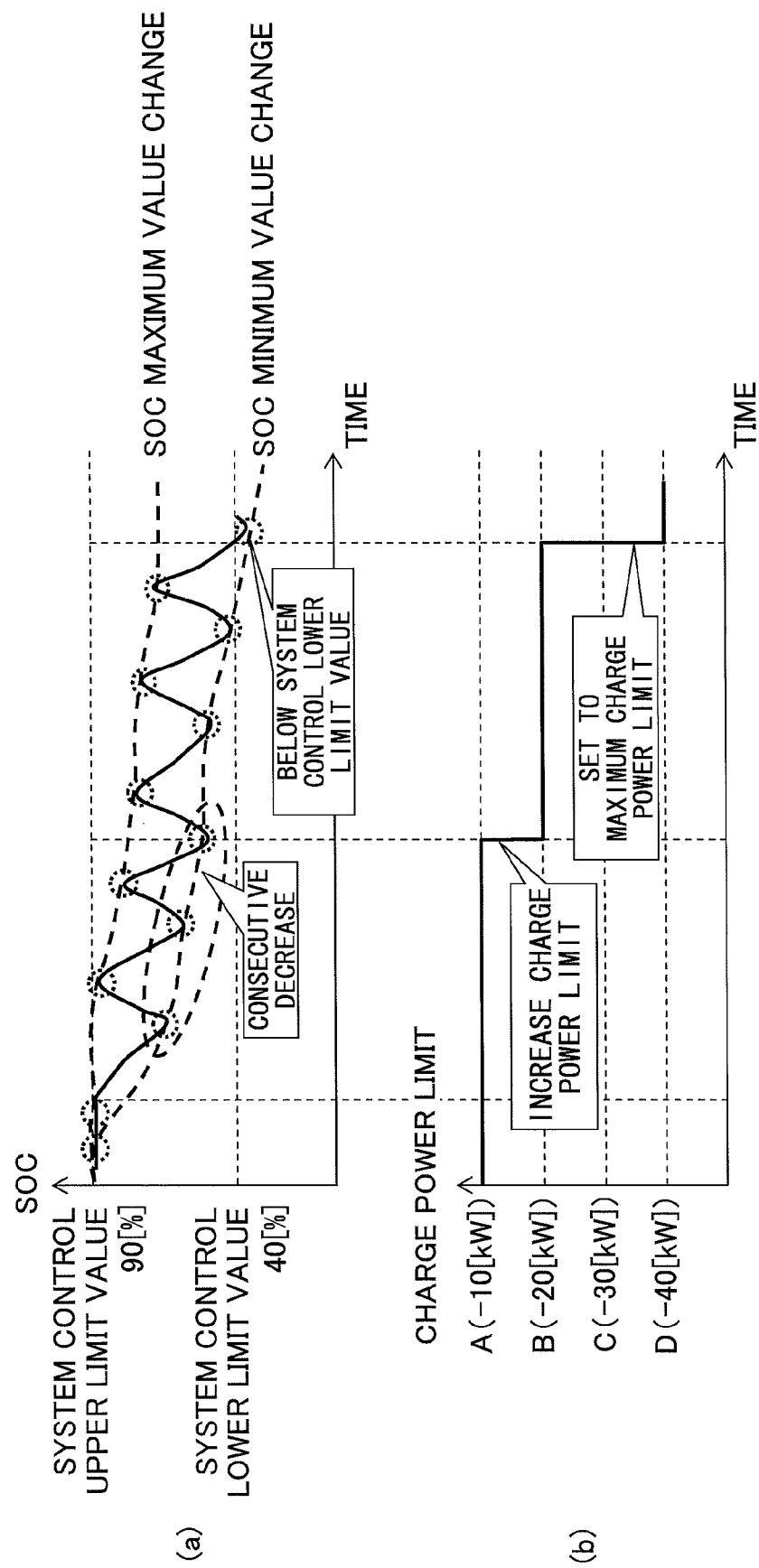
FIG. 8 is a graph illustrating a change in the charge rate and a corresponding charge power limit in an exemplary charge power limit control according to the first embodiment.

FIG. 8 illustrates a change in the charge rate SOC and a corresponding charge power limit in an exemplary charge power limit control according to the present embodiment. In the example illustrated in FIG. 8, the charge rate SOC of the capacitor 19 gradually decreases from the system control upper limit value (e.g., 90%), and in turn, the maximum value and the minimum value of the charge rate SOC gradually decreases over time. In the example illustrated in FIG. 8 (a), the number of determinations N is set equal to three (N=3). Thus, when the minimum value of the charge rate SOC has decreased with respect to a previous minimum value N=3 consecutive times, the charge power limit stage is switched to a stage that is one level higher; namely, the charge power limit stage is switched from stage A to stage B. In this way, the charge power limit value is increased from −10 kW to −20 kW (where the negative symbol denotes a charge). However, when the load increases thereafter, output of the engine assist operation by the motor generator 12 and/or output to the turning motor 21 increase as well. Thus, the charge rate SOC continues to decrease, and this time, the minimum value falls below the system control lower limit value. Accordingly, as illustrated in FIG. 8 (b), at the time point where the minimum value has fallen below the system control lower limit value, the charge power limit stage is switched to the highest stage; namely, from stage B to stage D. In this way, the charge power limit value is increased from −20 kW to −40 kW so that the capacitor 19 may be charged more quickly.

It is noted that although FIG. 8 illustrates an exemplary case where the minimum value of the charge rate SOC decreases with respect to a previous minimum value N=3 consecutive times, in a case where the maximum value of the charge rate SOC increases with respect to a previous maximum value N=3 consecutive times, the charge power limit stage is switched to a stage that is one level lower.

Figure 9:
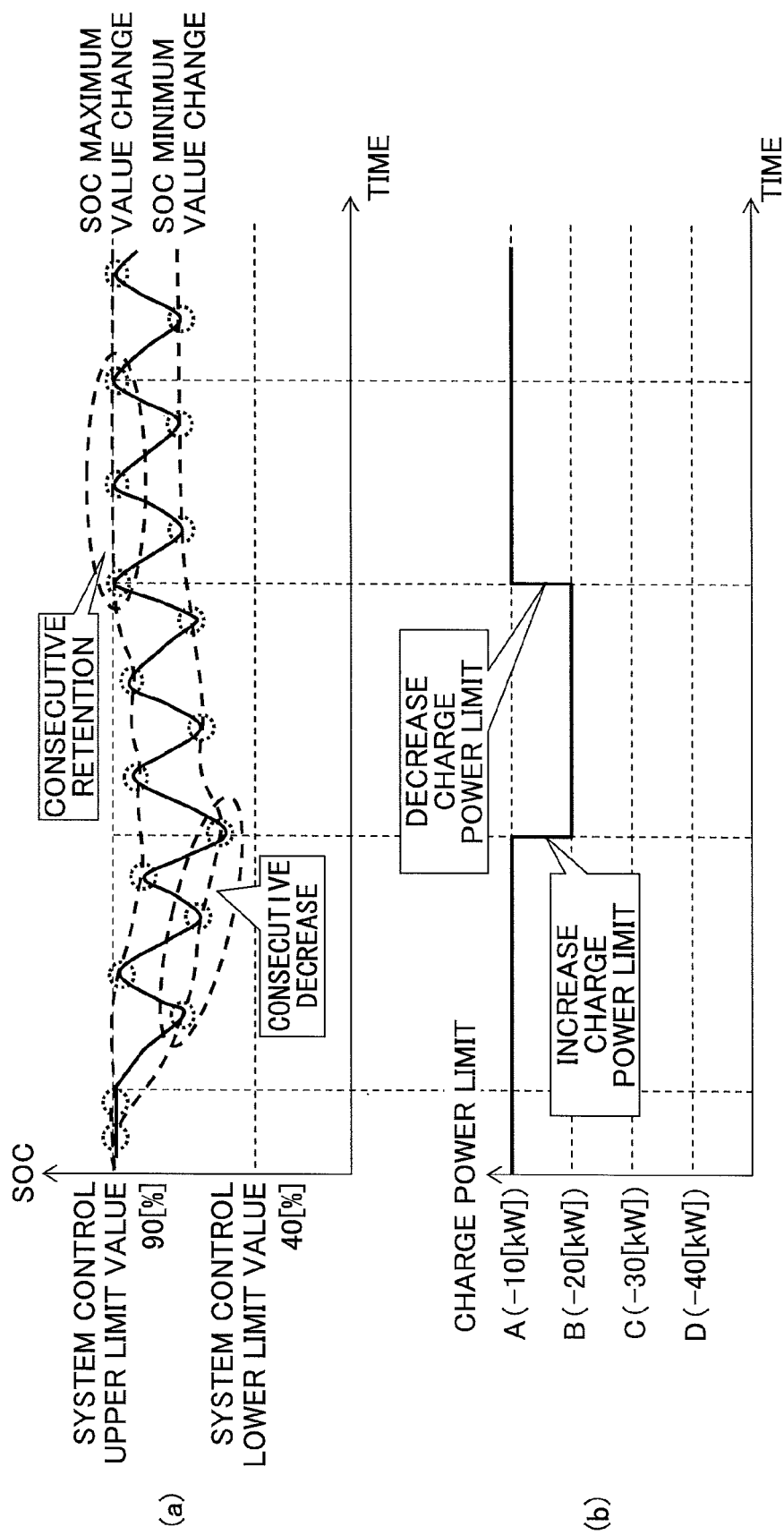
FIG. 9 is a graph illustrating a change in the charge rate and a corresponding charge power limit in another exemplary charge power limit control according to the first embodiment.

FIG. 9 illustrates a change in the charge rate SOC and a corresponding charge power limit of another exemplary charge power limit control according to the present embodiment. In the example illustrated in FIG. 9, the charge rate SOC of the capacitor 19 gradually decreases from the system control upper limit value (e.g., 90%), and in turn, the maximum value and the minimum value of the charge rate SOC gradually decreases over time. In the example illustrated in FIG. 9 (a), the number of determinations N is set equal to three (N=3). Thus, at the time point where the minimum value of the charge rate SOC has decreased from the previous minimum value N=3 consecutive times, the charge power limit stage is switched to a stage that is one level higher; namely, from stage A to stage B. In this way, the charge power limit value is increased from −10 kW to −20 kW (where the negative symbol demotes a charge).

Unlike the example illustrated in FIG. 8, in the present example, when the charge power limit value is increased from −10 kW to −20 kW, the charge rate SOC starts increasing, and this time, the maximum value of the charge rate is retained equal to the system control upper limit value N=3 consecutive times (because the charge rate SOC is controlled to not exceed the system control upper limit value, the maximum value does not exceed the system control upper limit value). As illustrated in FIG. 9 (b), at the time point where the maximum value has increased N=3 consecutive times, the charge power limit stage is switched to a stage that is one level lower; namely, from stage B to stage A. In this way, the charge power limit value is decreased from −20 kW to −10 kW so that the charge power is controlled to decrease. It is noted that although the charge power limit control according to the present embodiment is implemented based on the SOC of the capacitor 19 as the charge rate, in other alternative embodiments, the voltage value of the electrical energy storage unit may be used as the charge rate instead of the SOC, for example. By decreasing the charge power limit when the maximum value of the charge rate SOC consecutively increases a predetermined number of times in the manner described above, the charge rate SOC may be controlled to be within the system control upper limit value.

Also, the charge power limit may be decreased in a case where the charge rate SOC is consecutively retained at the system control upper limit value.

Figure 10:
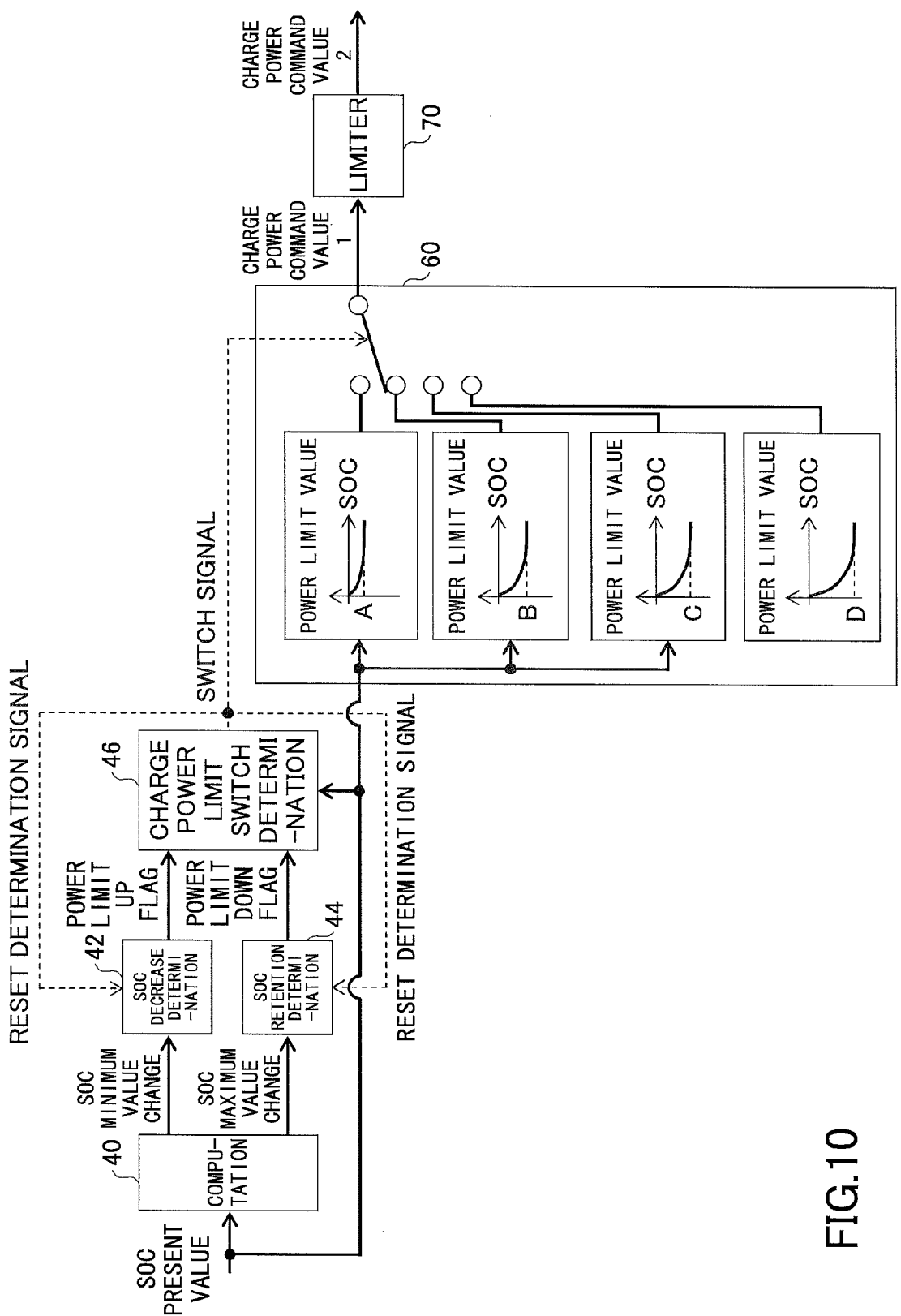
FIG. 10 is a block diagram illustrating charge amount control according to a second embodiment of the present invention.

In the following, charge amount control according to a second embodiment of the present invention is described. FIG. 10 is a block diagram illustrating charge amount control according to the second embodiment. It is noted that in FIG. 10, functional blocks that correspond to those illustrated in FIG. 6 are given the same reference numerals and their descriptions are omitted.

In the present embodiment, the switch block 48 of FIG. 6 is replaced by a map switch block 60, and the charge power command value 1 is output from the map switch block 60. The charge power command value 1 is supplied to an upper-level process. When a charge power command value determined at the upper level process exceeds the charge power command value 1, the command value is limited by a limiter 70 and the resulting command value is output from the limiter 70 as charge power command value 2.

The map switch block 60 includes a plurality of maps 62-1 through 62-4 for generating the charge power command value 1. Map 62-1 represents a relationship between the charge rate SOC and the charge power limit value for stage A. When a present value of the charge rate SOC is input to map 62-1, a charge power command value 1 that is limited by the charge power limit value set up for stage A (e.g., −10 kW maximum) is output. Map 62-1 corresponds to a map for controlling the charge power so that the charge current flowing through the capacitor 19 does not exceed a predetermined current value (current value for stage A) regardless of the value of the charge rate SOC. Thus, when the charge power command value 1 output from map 62-1 is used, the capacitor 19 may be charged at a current value that does not exceed the predetermined value (current value for stage A) regardless of the value of the charge rate SOC. It is noted that in map 62-1, the charge power limit value decreases as the value of the charge rate SOC decreases. This is because when a charge current I is fixed, a charge power W is proportional to the square root of the charge rate SOC (W=I×VO×√SOC, where VO denotes the capacitor voltage at full charge).

Similarly, maps 62-2, 62-3, and 62-4 represent the relationship between the charge rate SOC and the charge power limit value for stage B, stage C, and stage D, respectively. When the present value of the charge rate SOC is input to maps 62-2, 62-3, and 62-4, charge power command values 1 limited by the charge power limit values set up for stage B, stage C, and stage D (e.g., −20 kW, −30 kW, and −40 kW) are output by the maps 62-2, 62-3, and 62-4, respectively. The maps 62-2, 62-3, and 62-4 correspond to maps for controlling the charge power so that the charge current flowing through the capacitor 19 does not exceed a predetermined current value (current values of stage B, stage C, and stage D) regardless of the value of the charge rate SOC. Thus, when the charge power command values 1 output from maps 62-2, 62-3, and 62-4 are used, the capacitor 19 may be charged at a current value that does not exceed the predetermined value (current values for stage B, stage C, and stage D) regardless of the value of the charge rate SOC.

Figure 11:
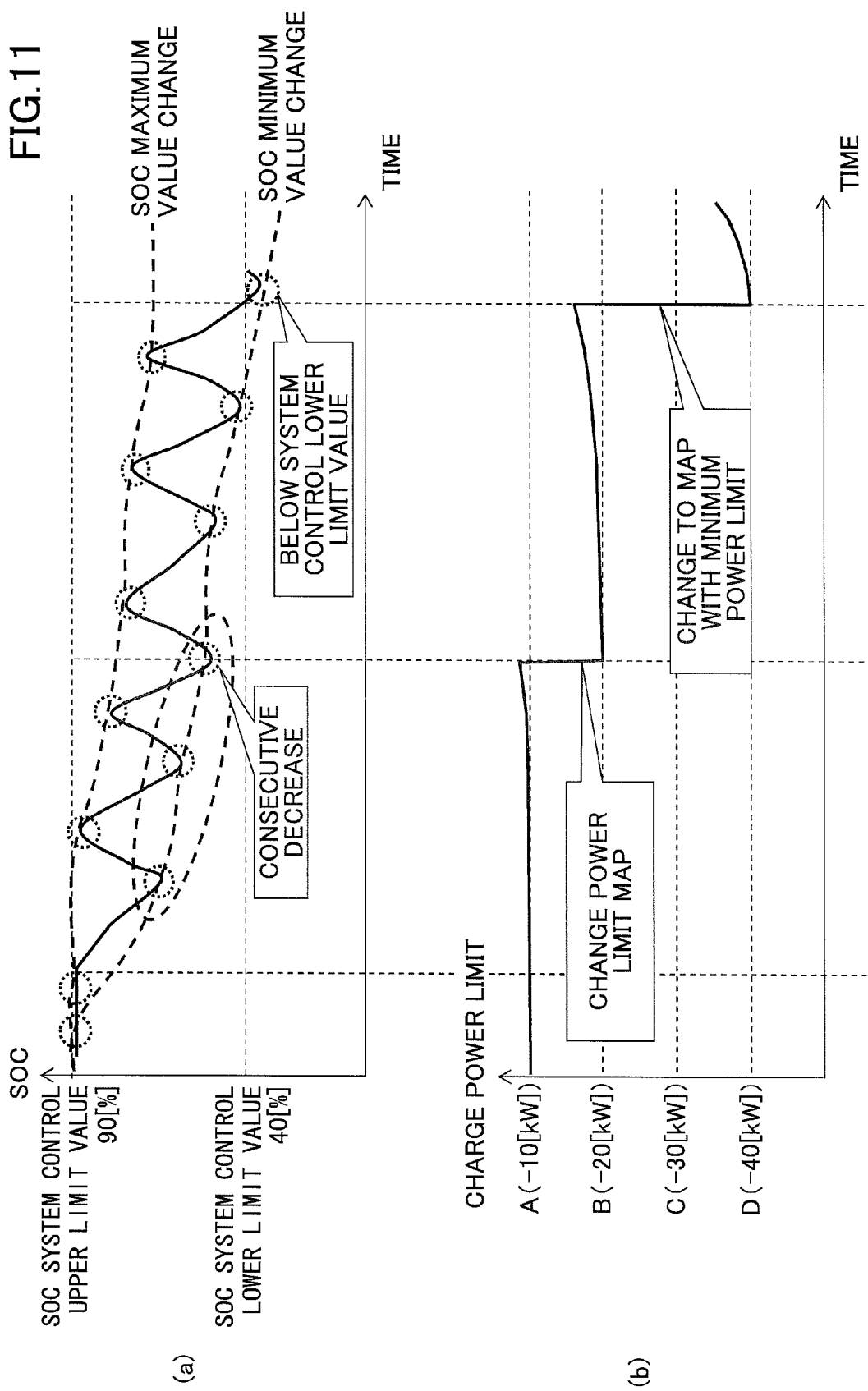
FIG. 11 is a graph illustrating a change in the charge rate and a corresponding charge power limit in an exemplary charge power control according to the second embodiment.

FIG. 11 illustrates a change in the charge rate SOC and a corresponding charge power limit in an exemplary charge power limit control according to the present embodiment. In the example illustrated in FIG. 11, the charge rate SOC of the capacitor 19 gradually decreases from the system control upper limit value (e.g., 90%), and in turn, the maximum value and the minimum value of the charge rate SOC gradually decreases. In the example illustrated in FIG. 11 (a), the number of determinations N is set equal to three (N=3). Thus, at the time point where the minimum value of the charge rate SOC has decreased with respect to a previous minimum value N=3 consecutive times, the charge power limit stage is switched to a stage that is one level higher; namely, from stage A to stage B. In this way, as illustrated in FIG. 11 (b), the charge power limit value is increased from the limit value of map 62-1 (stage A: −10 kW maximum) to the limit value of map 62-2 (stage B: −20 kW maximum) (where the negative symbol denotes a charge). However, when the load increases thereafter, output of the engine assist operation by the motor generator 12 and/or output to the turning motor 21 increase as well. Thus, the charge rate SOC continues to decrease, and this time, the minimum value falls below the system control lower limit value. Accordingly, at the time point where the minimum value falls below the system control lower limit value, the charge power limit stage is switched to the highest stage; namely, from stage B to stage D. In this way, the charge power limit value is increased from the limit value of map 62-2 (stage B: −20 kW maximum) to the limit value of map 62-4 (stage D: −40 kW maximum (maximum charge power)) so that the capacitor 19 may be charged more quickly.

In the following, charge amount control according to a third embodiment of the present invention is described. FIG.

Figure 12:
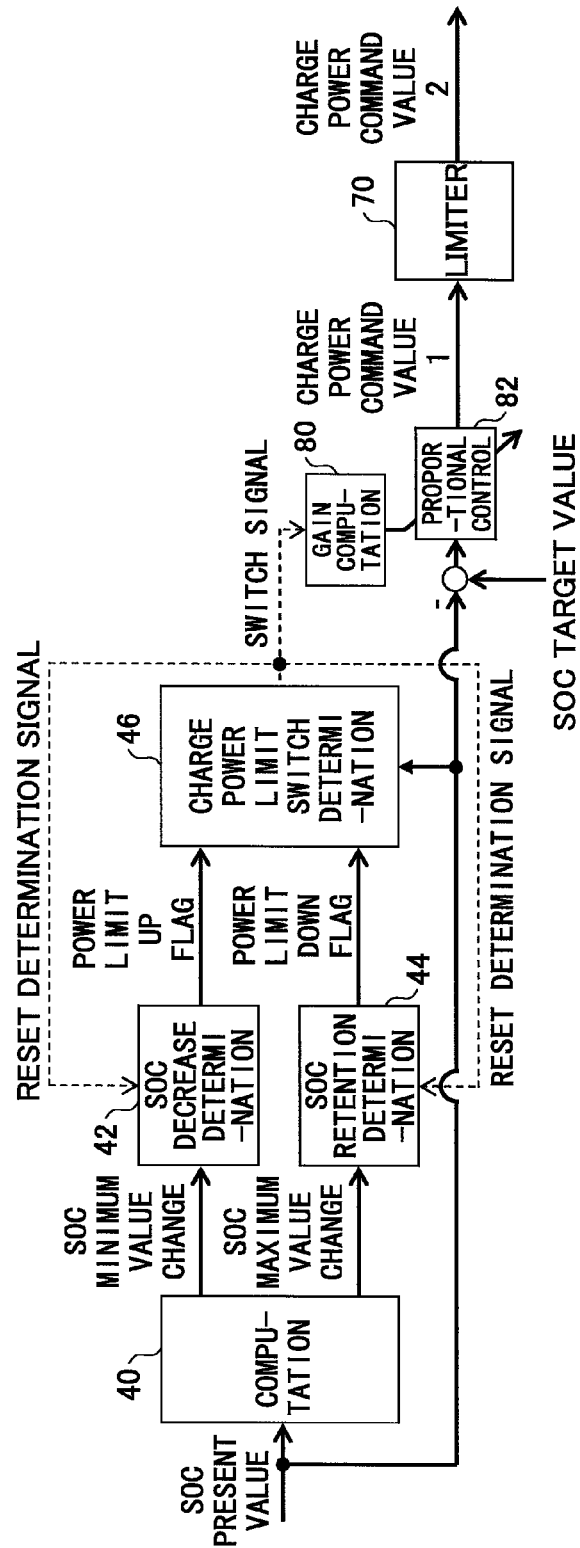
FIG. 12 is a block diagram illustrating charge amount control according to a third embodiment of the present invention.

12 is a block diagram illustrating the charge amount control according to the third embodiment. It is noted that in FIG. 12, functional blocks that correspond to those illustrated in FIG. 6 are given the same reference numerals and their descriptions are omitted.

In the present embodiment, the switch block 48 illustrated in FIG. 6 is replaced by a gain computation block 80 and a proportional control block 82, and the charge power command value 1 is output from the proportional control block 82. Also, a difference between the present value of the charge rate SOC and a SOC target value is input to the proportional control block 82. The charge power command value 1 output from the proportional control block 82 is supplied to an upper-level process. In a case where a charge power command value determined at the upper-level process is greater than the charge power command value 1, the command value is limited by a limiter 70 and the resulting command value is output from the limiter 70 as charge power command value 2.

The gain computation block 80 calculates a proportional gain for each stage based on the switch signal from the charge power limit switch determination block 46. The proportional control block 82 calculates the charge power command value 1 based on the difference between the charge rate SOC present value and the SOC target value and the proportional gain obtained by the gain computation block 80. The charge power command value 1 is supplied to an upper-level process. In a case where a charge power command value determined at the upper-level process is greater than the charge power command value 1, the charge power command value is limited by a limiter 70 and the resulting command value is output from the limiter 70 as charge power command value 2.

Figure 13:
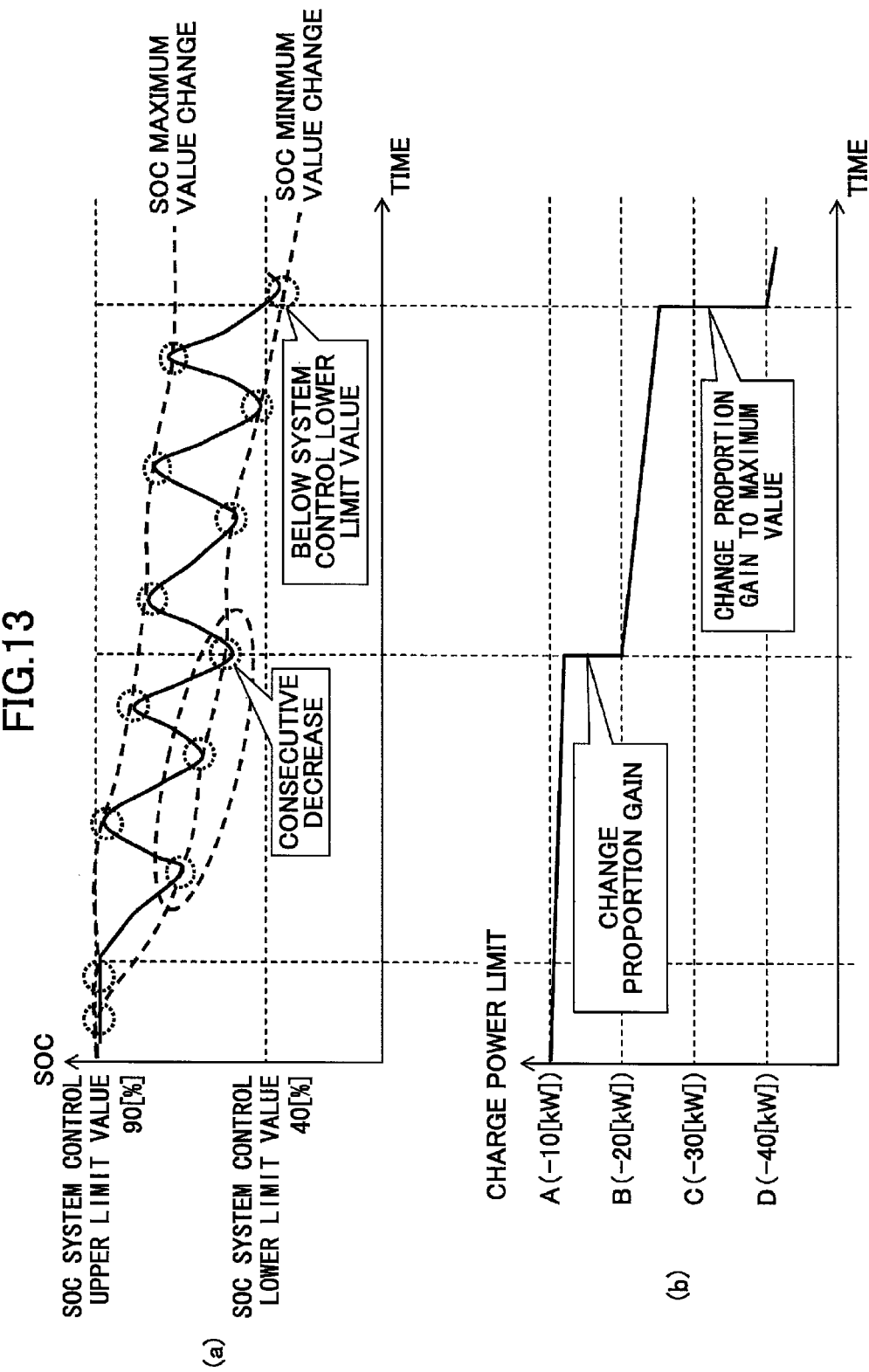
FIG. 13 is a graph illustrating a change in the charge rate and a corresponding charge power limit in an exemplary charge power limit control according to the third embodiment.

FIG. 13 illustrates a change in the charge rate SOC and a corresponding charge power limit in an exemplary charge power limit control according to the present embodiment. In the example illustrated in FIG. 13, the charge rate SOC of the capacitor 19 gradually decreases from the system control upper limit value (e.g., 90%), and in turn, the maximum value and the minimum value of the charge rate SOC gradually decreases. In the example illustrated in FIG. 13 (a), the number of determinations N is set equal to three (N=3). Thus, at the time point where the minimum value of the charge rate SOC has decreased with respect to a previous minimum value N=3 consecutive times, the charge power limit stage is switched to a stage that is one level higher; namely, from stage A to stage B. In this way, as illustrated in FIG. 13 (b), the charge power limit value is increased from the limit value for stage A (−10 kW+proportional gain) to the limit value of stage B (−20 kW+proportional gain) (where the negative symbol denotes a charge). However, when the load increases thereafter, output of the engine assist operation by the motor generator 12 and/or output to the turning motor 21 increase as well. Thus, the charge rate SOC continues to decrease, and this time, the minimum value falls below the system control lower limit value. Accordingly, at the time point where the minimum value falls below the system control lower limit value, the charge power limit stage is switched to the highest stage; namely, from stage B to stage D. In this way, the charge power limit value is increased from the limit value for stage B (−20 kW+proportional gain) to the limit value for stage D (maximum charge power: −40 kW+proportional gain) so that the capacitor 19 may be charged more quickly.

Figure 14:
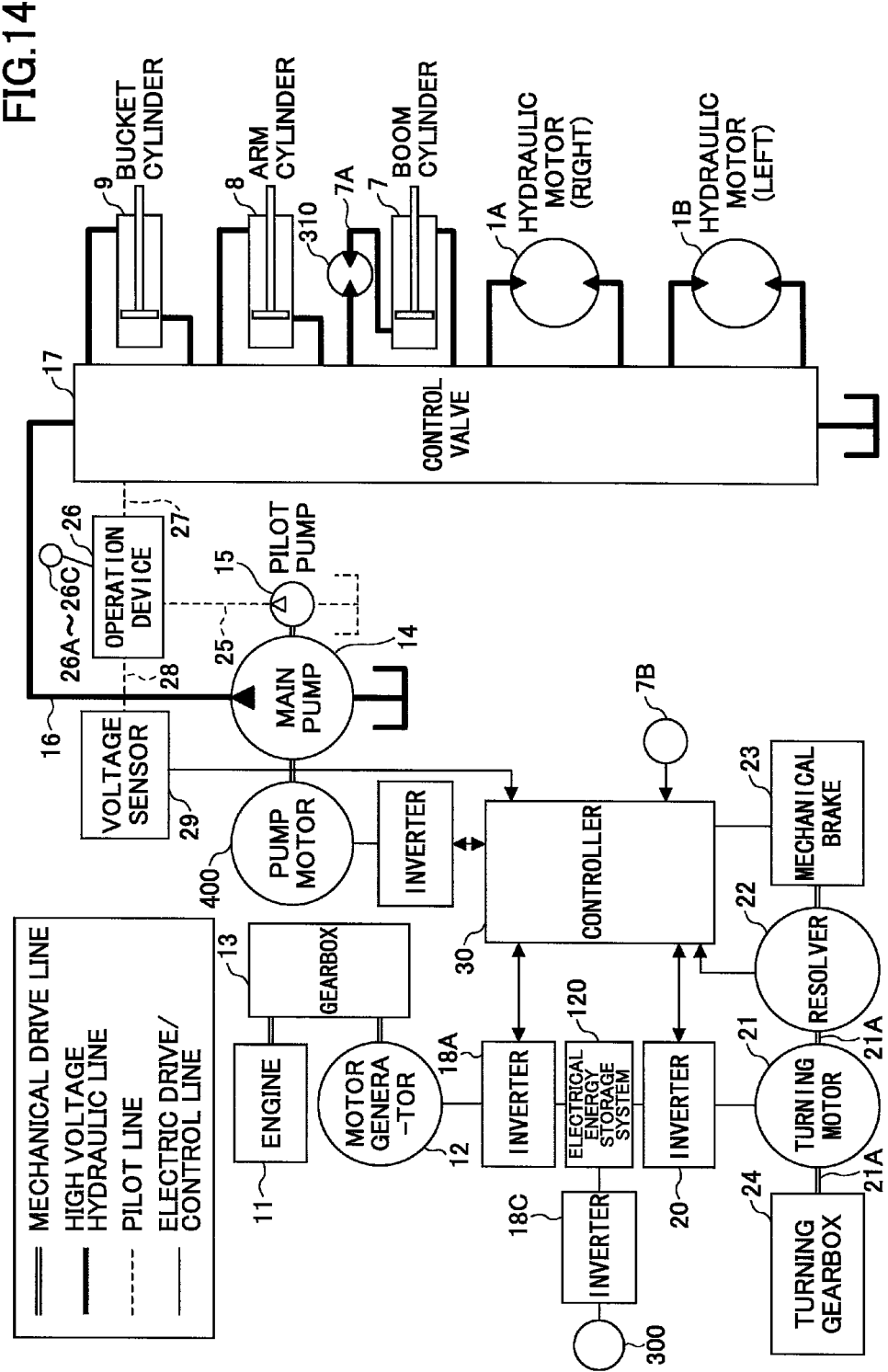
FIG. 14 is a block diagram illustrating a configuration of a drive system of a series hybrid excavator.

It is noted that the above described embodiments relate to applications of the present invention to the so-called parallel hybrid excavator that has the engine 11 and the motor generator 12 connected to the main pump 14 (hydraulic pump) to drive the main pump 14. However, in other alternative embodiments, the present invention may be applied to the so-called series hybrid excavator as illustrated in FIG. 14, for example, in which the motor generator 12 is driven by the engine 11, electric power generated by the motor generator 12 is stored in the electrical energy storage system 120, and the main pump 14 is driven solely by the electric power stored in the electrical energy storage system 120. In this case, the motor generator 12 may only have a generator function for generating electric power upon being driven by the engine 11.

Figure 15:
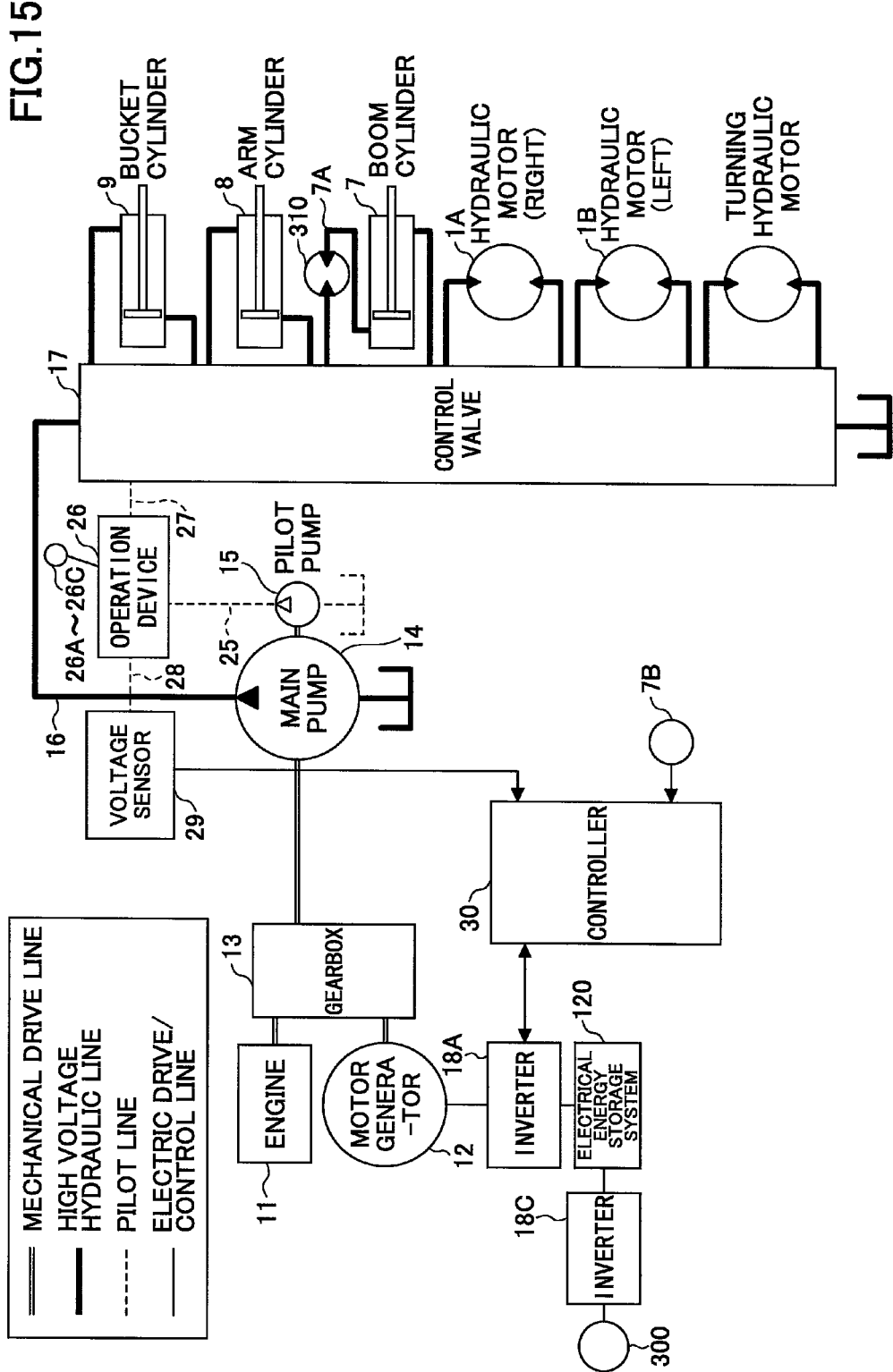
FIG. 15 is a block diagram illustrating a configuration of a drive system of a hybrid excavator in which all the drive parts are hydraulically actuated.

Also, the present disclosure may be applied to a hybrid excavator as illustrated in FIG. 15, for example, in which all the drive parts are hydraulically actuated. In the hybrid excavator illustrated in FIG. 15, electric power generated by the motor generator 12 by using excess power of the engine 11 and electric power generated by the boom regeneration motor 300 are stored in the electrical energy storage system 120. The electric power stored in the electrical energy storage system 120 is used to assist the output of the engine 11.

Figure 16:
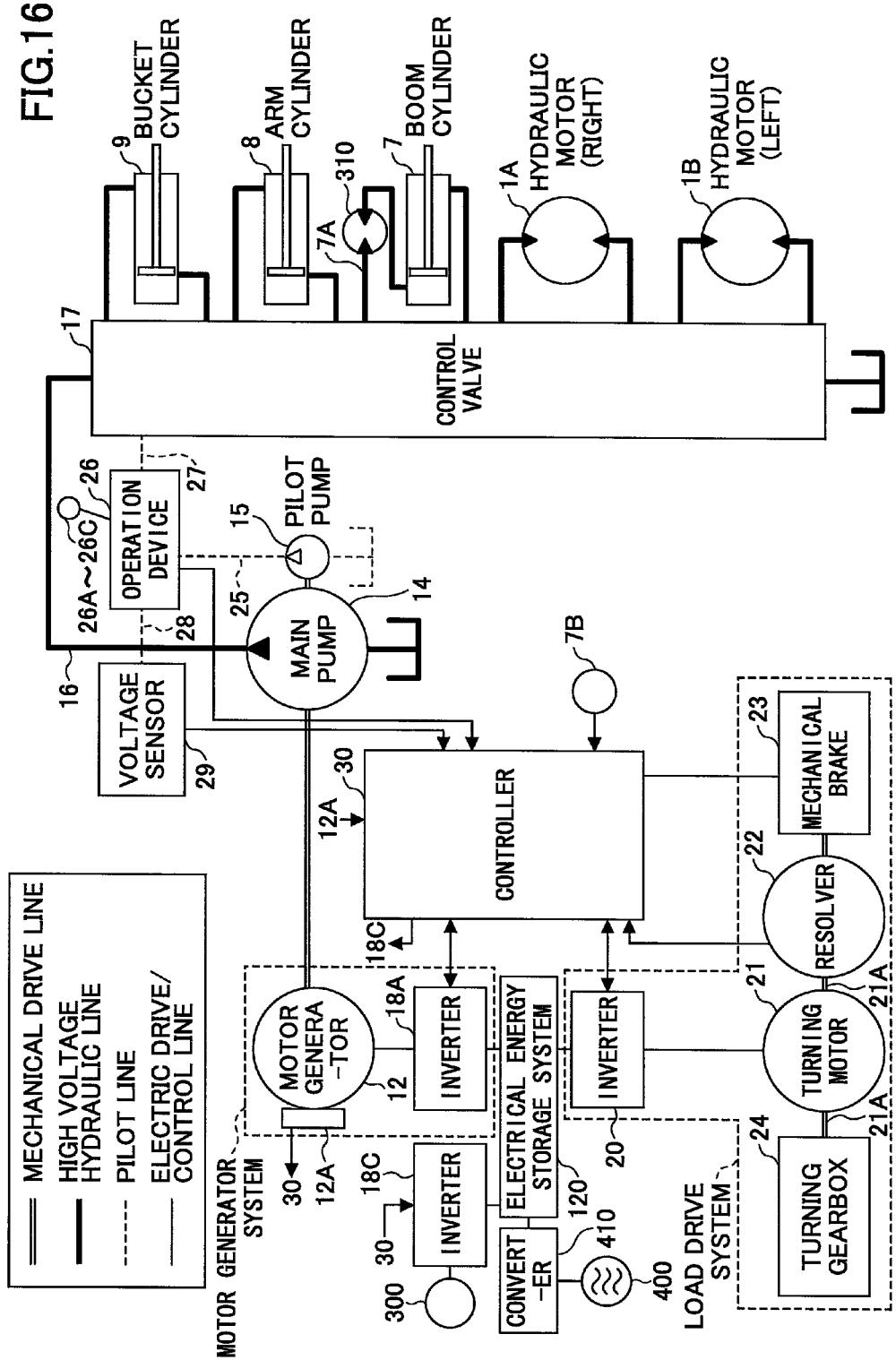
FIG. 16 is a block diagram illustrating a configuration of an electric excavator.

Further, the present invention may be applied to an electric excavator as illustrated in FIG. 16, for example, that does not have an engine so that a hydraulic pump is driven solely by a generator. FIG. 16 is a block diagram illustrating an exemplary configuration of a drive system of such an electric excavator. The motor generator 12 that functions as the generator is connected to the main pump 14 corresponding to a hydraulic pump, and the main pump 14 is driven solely by the motor generator 12. The electrical energy storage system 120 is connected to an external power source 400 via a converter 410, and the electrical energy storage part (capacitor 19) of the electrical energy storage system 120 is charged with an electric power supply from the external power source 400.

It is noted that the present invention is not limited to the embodiments described above, and various changes and modifications may be made without departing from the scope of the present disclosure.

The present international application is based on and claims the benefit of priority of Japanese Patent Application No. 2011-016545, filed on Jan. 28, 2011, the contents of which are incorporated herein by reference in their entirety.

Industrial Applicability

The present invention is applicable to an excavator having an electrical energy storage unit for supplying electric power to an electric work element.

DESCRIPTION OF REFERENCE NUMERALS 1 lower running body
1A, 1B hydraulic motors
2 turning mechanism
3 upper turning body
4 boom
5 arm
6 bucket
7 boom cylinder
7A hydraulic piping
7B boom angle sensor
8 arm cylinder
9 bucket cylinder
10 cabin
11 engine
12 motor generator
13 gearbox
14 main pump
15 pilot pump
16 high voltage hydraulic line
17 control valve
18, 18A, 18C, 20 inverters
19 capacitor 21 turning motor
22 resolver
23 mechanical brake
24 turning gearbox
25 pilot line
26 operation device
26A, 26B levers
26C pedal
27 hydraulic line
28 hydraulic line
29 voltage sensor
30 controller
35 display device
40 computation block
42 SOC decrease determination block
44 SOC retention determination block
46 charge power limit switch block
48 switch block
50 limiter
60 map switch block
70 limiter
80 gain computation block
82 proportional control block
100 up-down voltage converter
101 reactor
102A voltage raising IGBT
102B voltage lowering IGBT
104 power supply connection terminal
106 output terminal
107 capacitor
110 DC bus
111 DC bus voltage detecting part
112 capacitor voltage detecting part
113 capacitor current detecting part
120 electrical energy storage system
300 boom regeneration motor (generator)
310 boom regeneration hydraulic motor
400 external power source
410 converter

The invention claimed is:

1. An excavator comprising:
an electric load;
an electrical energy storage part that supplies stored electric power to the electric load; and
a control unit that controls an amount of charge to the electrical energy storage part so that a state of charge of the electrical energy storage part is between an upper limit value and a lower limit value,
wherein the control unit controls the amount of charge to the electrical energy storage part based on a changing trend of a plurality of detection values of the state of charge, the plurality of detection values being obtained over a predetermined time period, and
wherein when a predetermined number of the plurality of detection values are consecutively determined to be greater than respective preceding detection values of the state of charge or when a predetermined number of the plurality of detection values are consecutively retained at the upper limit value, the control unit determines that the amount of charge is excessive and decreases a limit value for the amount of charge.

2. The excavator as claimed in claim 1, wherein
the control unit detects as the plurality of detection values maximum values of changes in the state of charge of the electrical energy storage part.

3. The excavator as claimed in claim 1, wherein
when a predetermined number of the plurality of detection values are consecutively determined to be less than respective preceding detection values of the state of charge, the control unit determines that the amount of charge is insufficient and increases a limit value for the amount of charge.

4. The excavator as claimed in claim 1, wherein
the control unit detects, as the plurality of detection values, minimum values of changes in the state of charge of the electrical energy storage part and increases a limit value for the amount of charge based on a changing trend of the minimum values.

5. The excavator as claimed in claim 1, wherein
when a minimum value of the state of charge is determined to be less than or equal to the lower limit value, the control unit increases a limit value for the amount of charge.

6. The excavator as claimed in claim 1, wherein
a plurality of limit values according to a change in the state of charge are set up as a limit value for the amount of charge.

7. The excavator as claimed in claim 1, wherein
the control unit includes a limitation part that limits a command value for a charge power supplied to the electrical energy storage part.

8. The excavator as claimed in claim 1, wherein
the control unit changes a command value for a charge power supplied to the electrical energy storage part based on a changing trend of the plurality of detection values.

9. The excavator as claimed in claim 8, wherein
the control unit includes a plurality of maps each configured to generate the command value based on the state of charge of the electrical energy storage part, and the control unit switches one of the plurality of maps to be used to generate the command value based on the changing trend of the plurality of detection values.

10. The excavator as claimed in claim 9, wherein
the plurality of maps generate the command values that are different from each other in response to a present one of the plurality of detection values being input to the plurality of maps.

11. The excavator as claimed in claim 8, wherein
the control unit changes a gain with respect to the command value based on the changing trend of the plurality of detection values.

12. The excavator as claimed in claim 1, wherein
the control unit controls the amount of charge to the electrical energy storage part by changing a limit value for the amount of charge based on the changing trend of the plurality of detection values.

13. A method of controlling an excavator that includes an electrical storage part that supplies stored electric power to an electric load, the method comprising:
controlling an amount of charge to the electrical energy storage part so that a state of charge of the electrical energy storage part is between an upper limit value and a lower limit value;
obtaining a plurality of detection values of the state of charge over a predetermined time period;
determining a changing trend of the obtained plurality of detection values of the state of charge;
controlling the amount of charge to the electrical energy storage part based on the determined changing trend; and determining that the amount of charge is excessive and decreasing a limit value for the amount of charge when a predetermined number of the plurality of detection values are consecutively determined to be greater than respective preceding detection values of the state of charge or when a predetermined number of the plurality of detection values are consecutively retained at the upper limit value.

14. The method as claimed in claim 13, wherein
said controlling controls the amount of charge to the electrical energy storage part by changing a limit value for the amount of charge based on the changing trend of the plurality of detection values.

* * * * *